(12) United States Patent  
Cui et al.

(10) Patent No.: US 11,398,627 B2  
(45) Date of Patent: Jul. 26, 2022

(54) CATHODE ADDITIVES FOR LITHIUM-ION BATTERIES

(71) Applicant: The Board of Trustees of the Leland Stanford Junior University, Stanford, CA (US)

(72) Inventors: Yi Cui, Stanford, CA (US); Yongming Sun, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 291 days.

(21) Appl. No.: 15/179,545

(22) Filed: Jun. 10, 2016

(65) Prior Publication Data

US 2016/0365566 A1   Dec. 15, 2016

Related U.S. Application Data

(60) Provisional application No. 62/174,853, filed on Jun. 12, 2015.

(51) Int. Cl.

| | |
|---|---|
| *H01M 4/1391* | (2010.01) |
| *H01M 10/0525* | (2010.01) |
| *H01M 4/134* | (2010.01) |
| *H01M 4/1395* | (2010.01) |
| *H01M 4/131* | (2010.01) |
| *H01M 4/136* | (2010.01) |
| *H01M 4/62* | (2006.01) |
| *H01M 4/1397* | (2010.01) |

(Continued)

(52) U.S. Cl.
CPC ............... *H01M 4/62* (2013.01); *H01M 4/13* (2013.01); *H01M 4/139* (2013.01); *H01M 4/136* (2013.01); *H01M 4/5825* (2013.01); *H01M 10/0525* (2013.01)

(58) Field of Classification Search
CPC ............ H01M 10/0525; H01M 4/364; H01M 2300/0068; H01M 4/13; H01M 4/139; H01M 4/1395; H01M 4/382; H01M 4/405

See application file for complete search history.

(56) References Cited

U.S. PATENT DOCUMENTS 3,881,951 A * 5/1975 McCoy ................... H01M 4/13  
   429/220  
3,933,521 A * 1/1976 Vissers ............... H01M 10/399  
   429/221

(Continued)

OTHER PUBLICATIONS

Jarvis, C.R. et al. (2006) "A prelithiated carbon anode for lithium-ion battery applications," J Power Sources 162:800-802.

(Continued)

*Primary Examiner* — Imran Akram  
(74) *Attorney, Agent, or Firm* — Sheppard Mullin Richter & Hampton LLP

(57) ABSTRACT

In some implementations, a cathode is formed by (1) providing a cathode additive including (a) a matrix including a lithium compound, and (b) metal nanostructures embedded in the matrix; and (2) combining the cathode additive with a cathode active material to form a mixture. In other implementations, a cathode is formed by (1) providing a cathode additive including a compound of lithium and at least one non-metal or metalloid; and (2) combining the cathode additive with a cathode active material to form a mixture.

7 Claims, 35 Drawing Sheets

(51) Int. Cl.
*H01M 4/13* (2010.01)
*H01M 4/139* (2010.01)
*H01M 4/58* (2010.01)

(56) References Cited

U.S. PATENT DOCUMENTS

| | | | | |
|---|---|---|---|---|
| 3,957,532 A | * | 5/1976 | Settle | H01M 4/40 429/231.95 |
| RE30,392 E | * | 9/1980 | Roche | C25C 3/00 429/72 |
| 5,350,647 A | * | 9/1994 | Hope | H01M 4/46 429/222 |
| 5,642,562 A | * | 7/1997 | Tuttle | H01M 4/0404 29/623.3 |
| 2002/0114995 A1 | * | 8/2002 | Thackeray | C01G 23/002 429/224 |
| 2006/0057463 A1 | * | 3/2006 | Gao | C01G 19/00 429/231.95 |
| 2009/0272949 A1 | * | 11/2009 | Buttry | H01B 1/127 977/773 |
| 2010/0210453 A1 | * | 8/2010 | Hu | H01M 4/8605 502/184 |
| 2010/0239912 A1 | * | 9/2010 | Saito | H01M 10/058 429/224 |
| 2010/0276217 A1 | * | 11/2010 | Sugaya | C01G 53/42 180/65.1 |
| 2011/0151283 A1 | * | 6/2011 | Gillaspie | H01M 4/525 429/7 |
| 2011/0244305 A1 | * | 10/2011 | Zhang | H01M 4/382 429/144 |
| 2012/0196204 A1 | * | 8/2012 | Yoon | H01M 8/142 429/475 |
| 2014/0170493 A1 | * | 6/2014 | Holme | H01M 4/04 429/220 |
| 2014/0227548 A1 | * | 8/2014 | Myrick | C10L 1/28 428/570 |
| 2014/0272564 A1 | * | 9/2014 | Holme | H01M 4/364 429/211 |
| 2014/0315078 A1 | | 10/2014 | Chang et al. | |
| 2014/0317912 A1 | * | 10/2014 | Holme | H01M 4/624 29/623.1 |
| 2014/0342209 A1 | * | 11/2014 | He | H01M 10/056 429/101 |
| 2015/0064568 A1 | | 3/2015 | Yushin et al. | |
| 2015/0132642 A1 | * | 5/2015 | Joo | H01M 4/5815 429/217 |
| 2015/0147616 A1 | * | 5/2015 | Chemelewski | H01M 50/166 429/94 |
| 2016/0049655 A1 | * | 2/2016 | Fasching | H01M 4/364 264/5 |
| 2016/0149153 A1 | * | 5/2016 | Scharner | H01L 51/5206 257/40 |
| 2016/0248100 A1 | * | 8/2016 | Joo | H01M 4/8828 |
| 2016/0344035 A1 | * | 11/2016 | Zhamu | H01M 4/366 |
| 2017/0155144 A1 | * | 6/2017 | Yamauchi | C01G 51/50 |

OTHER PUBLICATIONS

Kim, M.G. et al. (2008) "Air stable Al2O3-coated Li2NiO2 cathode additive as a surplus current consumer in a Li-ion cell," J Mater Chem. 18:5880-5887.

Noh, M. et al. (2012) "Role of Li6CoO4 Cathode Additive in Li-Ion Cells Containing Low Coulombic Efficiency Anode Material," J Electrochem Soc. 159(8):A1329-A1334.

Wang, Z.H. et al. (2014) "Application of Stabilized Lithium Metal Powder (SLMP®) in graphite anode—A high efficient prelithiation method for lithium-ion batteries," J Power Sources 260:57-61.

Zhao, J. et al. (2014) "Dry-air-stable lithium silicide-lithium oxide core-shell nanoparticles as high-capacity prelithiation reagents," Nat Commun. 5:5088.

* cited by examiner

| | Composite (Molar ratio) | Density /g cm$^{-3}$ | Reaction Mechanism | Specific capacity /mAh g$^{-1}$ | Volumetric capacity /mAh cm$^{-3}$ |
|---|---|---|---|---|---|
| 1 | Fe/Li$_2$O (3/4) | 3.55 | $4Li_2O + 3Fe^0 \rightarrow Fe_3O_4 + 8Li^+ + 8e^-$ | 747 | 2655 |
| 2 | Fe/Li$_2$O (2/3) | 3.42 | $3Li_2O + 2Fe^0 \rightarrow Fe_2O_3 + 6Li^+ + 6e^-$ | 799 | 2735 |
| 3 | Ni/Li$_2$O (1/1) | 4.13 | $Li_2O + Ni^0 \rightarrow NiO + 2Li^+ + 2e^-$ | 605 | 2498 |
| 4 | Co/Li$_2$O (1/1) | 4.12 | $Li_2O + Co^0 \rightarrow CoO + 2Li^+ + 2e^-$ | 604 | 2486 |
| 5 | Co/Li$_2$O (3/4) | 3.72 | $4Li_2O + 3Co^0 \rightarrow Co_3O_4 + 8Li^+ + 8e^-$ | 724 | 2695 |
| 6 | Mn/Li$_2$O (3/4) | 3.49 | $4Li_2O + 3Mn^0 \rightarrow Mn_3O_4 + 8Li^+ + 8e^-$ | 754 | 2630 |
| 7 | Mn/Li$_2$O (2/3) | 3.36 | $3Li_2O + 2Mn^0 \rightarrow Mn_2O_3 + 6Li^+ + 6e^-$ | 806 | 2711 |
| 8 | Mn/Li$_2$O (1/1) | 3.82 | $Li_2O + Mn^0 \rightarrow MnO + 2Li^+ + 2e^-$ | 632 | 2412 |
| 9 | Mn/Li$_2$O (1/2) | 3.09 | $2Li_2O + Mn^0 \rightarrow MnO_2 + 4Li^+ + 4e^-$ | 935 | 2891 |
| 10 | Mo/Li$_2$O (1/2) | 3.98 | $2Li_2O + Mo^0 \rightarrow MoO_2 + 4Li^+ + 4e^-$ | 689 | 2740 |
| 11 | Mo/Li$_2$O (1/3) | 3.44 | $3Li_2O + Mo^0 \rightarrow MoO_3 + 6Li^+ + 6e^-$ | 866 | 2979 |
| 12 | Pb/Li$_2$O (1/2) | 5.56 | $2Li_2O + Pb^0 \rightarrow PbO_2 + 4Li^+ + 4e^-$ | 402 | 2233 |
| 13 | Ru/Li$_2$O (1/2) | 4.24 | $2Li_2O + Ru^0 \rightarrow RuO_2 + 4Li^+ + 4e^-$ | 667 | 2828 |
| 14 | Cu/Li$_2$O (1/1) | 4.25 | $Li_2O + Cu^0 \rightarrow CuO + 2Li^+ + 2e^-$ | 574 | 2438 |
| 15 | 2Cu/Li$_2$O (2/1) | 5.39 | $Li_2O + 2Cu^0 \rightarrow Cu_2O + 2Li^+ + 2e^-$ | 341 | 1842 |
| 16 | Si/Li2O (1/1) | 2.15 | $Li_2O + Si^0 \rightarrow SiO + 2Li^+ + 2e^-$ | 925 | 1991 |
| 17 | Si/Li2O (1/2) | 2.10 | $2Li_2O + Si^0 \rightarrow SiO_2 + 4Li^+ + 4e^-$ | 1220 | 2565 |
| 18 | Al/Li2O (2/3) | 2.22 | $3Li_2O + 2Al^0 \rightarrow Al_2O_3 + 6Li^+ + 6e^-$ | 1120 | 2490 |
| 19 | B/Li2O (2/3) | 2.07 | $3Li_2O + 2B^0 \rightarrow B_2O_3 + 6Li^+ + 6e^-$ | 1445 | 2987 |
| 20 | P/Li2O (2/5) | 1.95 | $5Li_2O + 2P^0 \rightarrow P_2O_5 + 10Li^+ + 10e^-$ | 1268 | 2474 |

FIG. 5

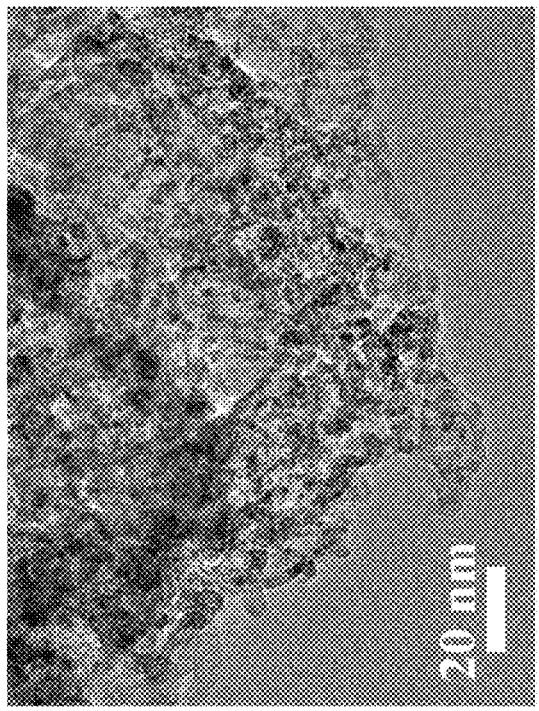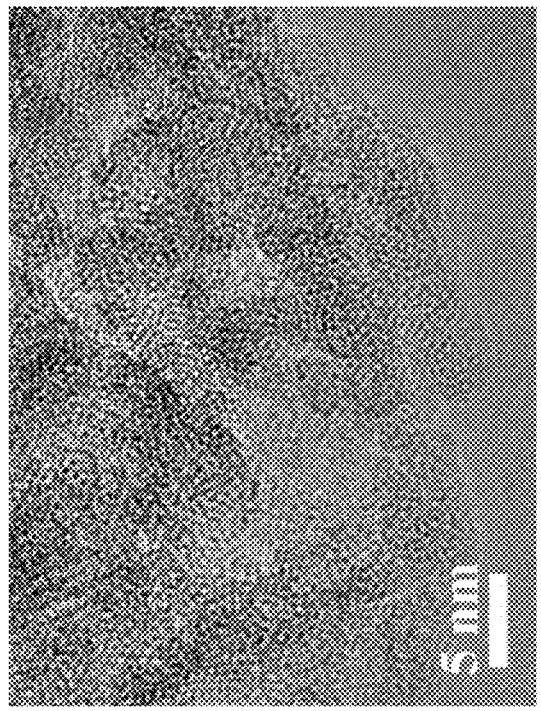
FIG. 16

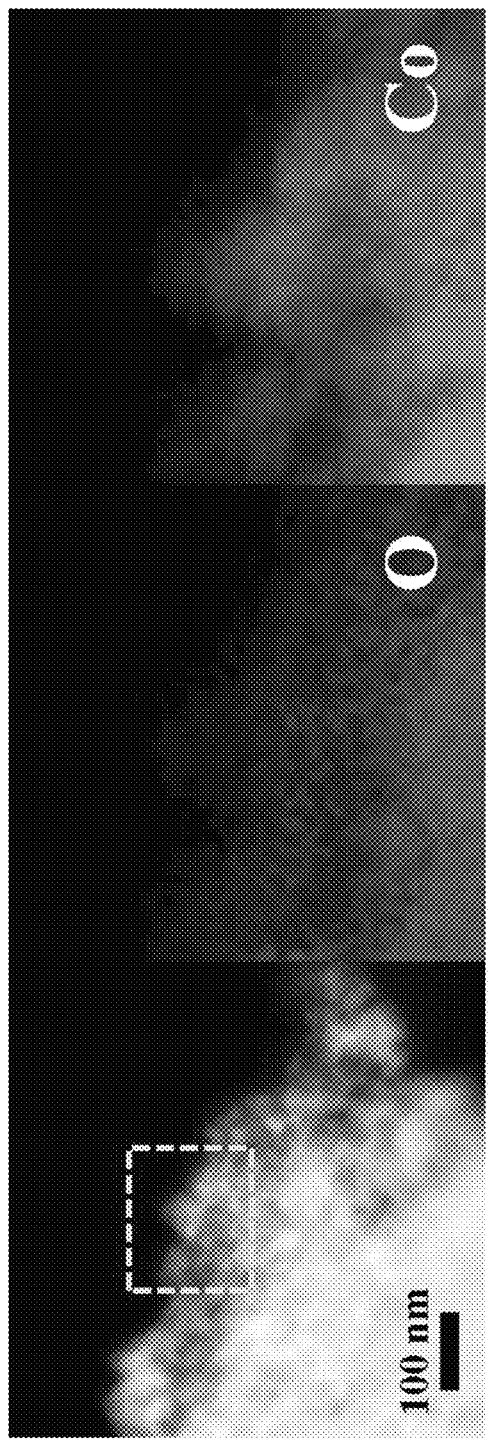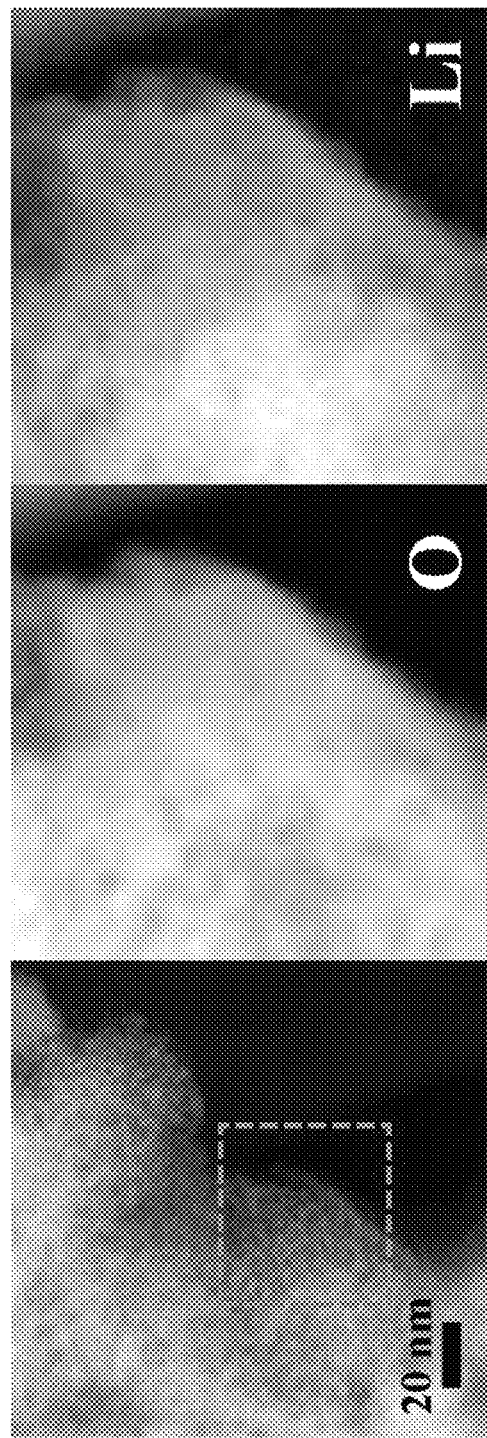
FIG. 17

CATHODE ADDITIVES FOR LITHIUM-ION BATTERIES

CROSS-REFERENCE TO RELATED APPLICATION

This application claims the benefit of U.S. Provisional Application No. 62/174,853, filed on Jun. 12, 2015, the disclosure of which is incorporated herein by reference in its entirety.

STATEMENT REGARDING FEDERALLY SPONSORED RESEARCH OR DEVELOPMENT

This invention was made with Government support under contract DE-AC02-76SF00515 awarded by the Department of Energy. The Government has certain rights in the invention.

TECHNICAL FIELD

This disclosure generally relates to electrode additives and, more particularly, cathode additives for lithium (Li)-ion batteries.

BACKGROUND

Rechargeable Li-ion batteries currently dominate the portable electronics market and exhibit great potential for electric vehicles, grid-scale energy storage, and renewable energy storage. Commercial Li-ion batteries are typically composed of two electrodes: an intercalated lithium transition metal oxide cathode (e.g., $LiCoO_2$, $LiMn_2O_4$, $LiNi_xM-n_yCo_zO_2$, Li-rich layered oxides, or $LiFePO_4$) and a graphite anode. During a first charge process, typically about 5-20% of the Li from the cathode is consumed due to solid electrolyte interphase (SEI) formation at the anode surface, leading to low first-cycle Columbic efficiency and large initial irreversible capacity loss. A method to compensate for the first-cycle Li loss is to load additional cathode materials. However, due to the low specific capacity (typically <about 200 mAh $g^{-1}$) of current cathode materials, a large amount of additional loading is involved, which reduces appreciably the specific energy and energy density of the entire battery.

It is against this background that a need arose to develop the embodiments described in this disclosure.

SUMMARY OF DISCLOSURE

Some aspects of this disclosure relate to a method of forming a cathode. In some embodiments, the method includes: (1) providing a cathode additive including (a) a matrix including a lithium compound, and (b) metal nanostructures embedded in the matrix; and (2) combining the cathode additive with a cathode active material to form a mixture.

In other embodiments, the method includes: (1) providing a cathode additive including a compound of lithium and at least one non-metal or metalloid; and (2) combining the cathode additive with a cathode active material to form a mixture.

Additional aspects of this disclosure relate to a cathode additive. In some embodiments, the cathode additive includes: (1) a matrix including a lithium compound; and (2) metal nanostructures embedded in the matrix. The lithium compound is a compound of lithium and at least one non-metal or metalloid, and the metal nanostructures have dimensions in a range of 1 nm to 50 nm.

Other aspects and embodiments of this disclosure are also contemplated. The foregoing summary and the following detailed description are not meant to restrict this disclosure to any particular embodiment but are merely meant to describe some embodiments of this disclosure.

BRIEF DESCRIPTION OF THE DRAWINGS

For a better understanding of the nature and objects of some embodiments of this disclosure, reference should be made to the following detailed description taken in conjunction with the accompanying drawings.

FIG. 5: The theoretical specific capacities and volumetric capacities of various M/Li$_2$O nanocomposites.

FIG. 16: TEM images of as-prepared N—Co/N—Li$_2$O nanocomposite ((a) and (b)).

FIG. 17: STEM/energy-dispersive X-ray spectroscopy (EDX) (a) and STEM/EELS (b) element mapping analysis of Co/Li$_2$O product. The substantially uniform distribution of Li$_2$O and Co in the nanocomposite is verified.

DETAILED DESCRIPTION

Figure 1:
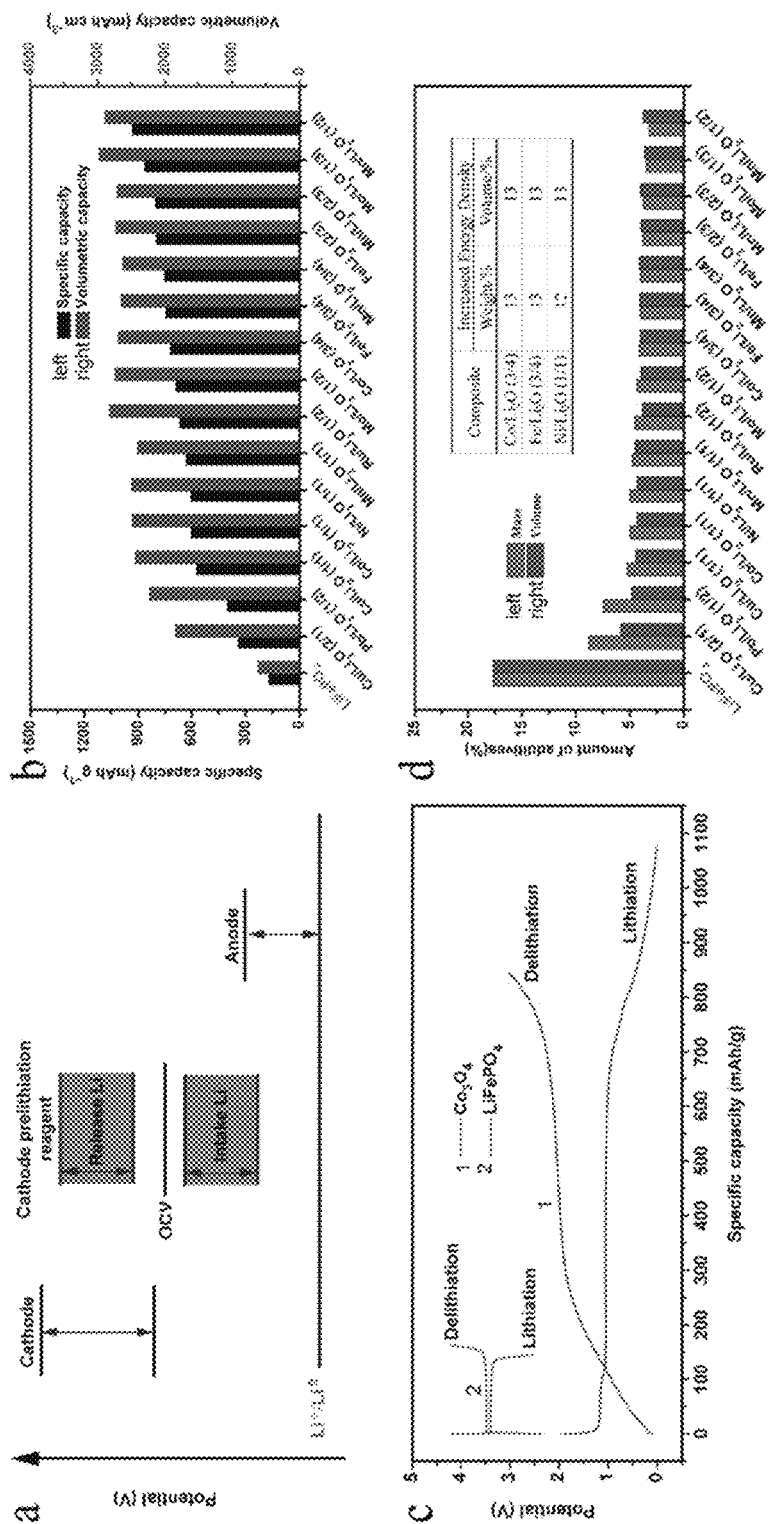
FIG. 1: Schematic of metal (M)/$Li_2O$ nanocomposite cathode additives for a lithium-ion battery. a, Potential criteria for cathode additives: substantially complete delithiation below the cut-off charge potential of cathode and starting lithiation below the cut-off discharge potential of cathode. b, The theoretical specific capacity of various M/$Li_2O$ nanocomposites based on inverse conversion reaction. c, The typical potential curves of metal oxides (MOs, e.g., $Co_3O_4$) and current commercial cathodes (e.g., $LiFePO_4$). The Li in M/$Li_2O$ nanocomposites can be extracted below the cut-off charge potential of cathode but Li is not consumed by MOs above the cut-off discharge potential of cathode. d, The amount of M/$Li_2O$ cathode prelithiation materials to achieve a substantially complete lithium compensation in comparison to that of using extra amount of cathode materials (in the case of $LiFePO_4$/graphite full cell with an initial irreversible lithium loss of about 30 mAh $g^{-1}$). The inset in (d) shows the energy density of the cathode can be increased appreciably after using M/$Li_2O$ cathode additives.

To address the challenges of first-cycle Li loss, embodiments of this disclosure are directed to compositions of cathode additives or prelithiation reagents as high specific capacity Li donors to offset an initial Li loss.

One aspect of some embodiments of this disclosure relates to a composition including a matrix including at least one lithium compound, and metal nanostructures (e.g., nanoparticles) embedded in the matrix.

In some embodiments, the matrix includes a compound of lithium (Li) and at least one non-metal or metalloid, such as an element of Group 15 of the periodic table (e.g., nitrogen (N) or phosphorus (P)), Group 16 of the periodic table (e.g., oxygen (O), sulfur (S), selenium (Se), or tellurium (Te)), or Group 17 of the periodic table (e.g., fluorine (F), chlorine (Cl), bromine (Br), or iodine (I)). In some embodiments, the matrix includes at least one of $Li_2O$, $Li_2S$, LiF, $Li_3P$, $Li_3N$, $Li_2Se$, $Li_2Te$, LiCl, LiBr or LiI. In some embodiments, the matrix includes $Li_2O$ as the lithium compound. In some embodiments, the matrix includes $Li_2S$ as the lithium compound. In some embodiments, the matrix includes LiF as the lithium compound. In some embodiments, the lithium compound is a lithium oxide, a lithium chalcogenide, a lithium halide, a lithium nitride, or a lithium phosphide. In some embodiments, the matrix includes a mixture of two or more different lithium compounds, such as selected from $Li_2O$, $Li_2S$, LiF, $Li_3P$, $Li_3N$, $Li_2Se$, $Li_2Te$, LiCl, LiBr and LiI.

In some embodiments, the lithium compound included in the matrix is in an amorphous state. In some embodiments, the lithium compound included in the matrix is in a crystalline state. In some embodiments, the lithium compound included in the matrix is a mixture of amorphous and crystalline states. In some embodiments, the matrix includes nanostructures (e.g., nanoparticles) of the lithium compound. In some embodiments, the matrix includes nanostructures of the lithium compound having at least one lateral dimension in the range of about 1 nm to about 100 nm, or about 2 nm to about 50 nm, or about 3 nm to about 20 nm, or about 3 nm to about 10 nm, or about 5 nm to about 10 nm. In some embodiments, the nanostructures of the lithium compound have aspect ratios of about 3 or less, or about 2.5 or less, or about 2 or less, or about 1.5 or less, and have an average or median diameter in the range of about 1 nm to about 100 nm, or about 2 nm to about 50 nm, or about 3 nm to about 20 nm, or about 3 nm to about 10 nm, or about 5 nm to about 10 nm. In some embodiments, the lithium compound included in the matrix is in an polycrystalline state. In some embodiments, grains or crystallites of the matrix in the polycrystalline state have at least one lateral dimension in the range of about 1 nm to about 100 nm, or about 2 nm to about 50 nm, or about 3 nm to about 20 nm, or about 3 nm to about 10 nm, or about 5 nm to about 10 nm.

In some embodiments, the metal nanostructures are randomly embedded in, or dispersed substantially throughout, the matrix, such as one composed of $Li_2O$, $Li_2S$, LiF, or a combination of two or more of the foregoing. In some embodiments, at least some of the metal nanostructures are disposed within (e.g., fully within) an interior of the matrix and below an exterior surface of the matrix.

In some embodiments, the metal nanostructures are in a crystalline state. In some embodiments, the metal nanostructures have at least one lateral dimension in the range of about 1 nm to about 100 nm, or about 1 nm to about 50 nm, or about 2 nm to about 50 nm, or about 3 nm to about 20 nm, or about 3 nm to about 10 nm, or about 5 nm to about 10 nm. In some embodiments, the metal nanostructures have aspect ratios of about 3 or less, or about 2.5 or less, or about 2 or less, or about 1.5 or less, and have an average or median diameter in the range of about 1 nm to about 100 nm, or about 2 nm to about 50 nm, or about 3 nm to about 20 nm, or about 3 nm to about 10 nm, or about 5 nm to about 10 nm.

In some embodiments, the metal nanostructures include at least one metal selected from: (1) transition metals, such as top row (or row 4) transition metals (e.g., titanium (Ti), vanadium (V), chromium (Cr), manganese (Mn), iron (Fe), cobalt (Co), nickel (Ni), copper (Cu), and zinc (Zn)), row 5 transition metals (e.g., yttrium (Y), zirconium (Zr), niobium (Nb), molybdenum (Mo), technetium (Tc), ruthenium (Ru), rhodium (Rh), palladium (Pd), silver (Ag), and cadmium (Cd)), and other transition metals; (2) post-transition metals (e.g., aluminum (Al), gallium (Ga), indium (In), tin (Sn), thallium (Tl), lead (Pb), and bismuth (Bi)); (3) metalloids (e.g., boron (B), silicon (Si), germanium (Ge), arsenic (As), antimony (Sb), tellurium (Te), and pollonium (Po)); and (4) lanthanides (e.g., lanthanum (La) and cerium (Ce)). In some embodiments, the metal nanoparticles include two or more different metals selected from the above mentioned lists.

In some embodiments, the metal nanostructures include at least one transition metal. In some embodiments, the metal nanostructures include at least one of Ti, Co, Ni, Fe, Mn, Mo, Pb, Zn, or Cu. In some embodiments, the metal nanostructures include at least one of Co, Ni, Fe, or Mn. In some embodiments, the metal nanostructures include at least one of Al, Sn, B, or Si. In some embodiments, phosphorus nanostructures are included in place of, or in addition to, metal nanostructures.

In some embodiments, the composition comprises, consists essentially of, or consists of transition metal nanoparticles embedded in a $Li_2O$ matrix. In some embodiments, the composition comprises, consists essentially of, or consists of transition metal nanoparticles embedded in a $Li_2S$ matrix. In some embodiments, the composition comprises, consists essentially of, or consists of transition metal nanoparticles embedded in a LiF matrix.

In some embodiments, the composition comprises, consists essentially of, or consists of post-transition metal nanoparticles embedded in a $Li_2O$ matrix. In some embodiments, the composition comprises, consists essentially of, or consists of post-transition metal nanoparticles embedded in a $Li_2S$ matrix. In some embodiments, the composition comprises, consists essentially of, or consists of post-transition metal nanoparticles embedded in a LiF matrix.

In some embodiments, the composition comprises, consists essentially of, or consists of metalloid nanoparticles embedded in a $Li_2O$ matrix. In some embodiments, the composition comprises, consists essentially of, or consists of metalloid nanoparticles embedded in a $Li_2S$ matrix. In some embodiments, the composition comprises, consists essentially of, or consists of metalloid nanoparticles embedded in a LiF matrix.

In some embodiments, the composition comprises, consists essentially of, or consists of a reaction product of molten Li metal with at least one transition metal oxide. In some embodiments, the composition comprises, consists essentially of, or consists of a reaction product of molten Li metal with at least one transition metal sulfide. In some embodiments, the composition comprises, consists essentially of, or consists of a reaction product of molten Li metal with at least one transition metal fluoride.

In some embodiments, the composition comprises, consists essentially of, or consists of a reaction product of molten Li metal with at least one metalloid oxide. In some embodiments, the composition comprises, consists essentially of, or consists of a reaction product of molten Li metal with at least one metalloid sulfide. In some embodiments, the composition comprises, consists essentially of, or consists of a reaction product of molten Li metal with at least one metalloid fluoride.

In some embodiments, the composition comprises, consists essentially of, or consists of a reaction product of molten Li metal with at least one post-transition metal oxide. In some embodiments, the composition comprises, consists essentially of, or consists of a reaction product of molten Li metal with at least one post-transition metal sulfide. In some embodiments, the composition comprises, consists essentially of, or consists of a reaction products of molten Li metal with at least one post-transition metal fluoride.

In some embodiments, a molar ratio of a metal included in the metal nanostructures to the lithium compound included in the matrix is in the range of about 1/10 to about 10/1, or about 1/5 to about 5/1, or about 1/3 to about 3/1, or about 1/2 to about 2/1. For example, the molar ratio can be about 3/4, about 2/3, about 1/1, about 1/2, about 1/3, about 2/1, or about 2/5.

In some embodiments, the composition is in a particulate form, such as including particles each including a matrix including at least one lithium compound, and metal nanostructures (e.g., nanoparticles) embedded in the matrix. In some embodiments, the particles have at least one lateral dimension in the range of about 1 nm to about 1 μm, or about 5 nm to about 800 nm, or about 10 nm to about 500 nm, or about 10 nm to about 300 nm, or about 50 nm to about 200 nm, or about 50 nm to about 100 nm. In some embodiments, the particles can be aggregated to form larger-sized secondary particles, such as having at least one lateral dimension of about 1 μm or greater.

Another aspect of some embodiments of this disclosure relates to a composition including at least one lithium compound.

In some embodiments, the lithium compound is a compound of lithium (Li) and at least one non-metal or metalloid, such as an element of Group 15 of the periodic table (e.g., nitrogen (N) or phosphorus (P)), Group 16 of the periodic table (e.g., oxygen (O), sulfur (S), selenium (Se), or tellurium (Te)), or Group 17 of the periodic table (e.g., fluorine (F), chlorine (Cl), bromine (Br), or iodine (I)). In some embodiments, the composition includes at least one of $Li_2O$, $Li_2S$, $LiF$, $Li_3P$, $Li_3N$, $Li_2Se$, $Li_2Te$, $LiCl$, $LiBr$ or $LiI$. In some embodiments, the composition includes $Li_3N$ as the lithium compound. In some embodiments, the composition includes $Li_2O$ as the lithium compound. In some embodiments, the composition includes $Li_2S$ as the lithium compound. In some embodiments, the composition includes $LiF$ as the lithium compound. In some embodiments, the lithium compound is a lithium oxide, a lithium chalcogenide, a lithium halide, a lithium nitride, or a lithium phosphide. In some embodiments, the composition includes a mixture of two or more different lithium compounds, such as selected from $Li_2O$, $Li_2S$, $LiF$, $Li_3P$, $Li_3N$, $Li_2Se$, $Li_2Te$, $LiCl$, $LiBr$ and $LiI$. In some embodiments, the composition comprises, consists essentially of, or consists of $Li_3N$.

In some embodiments, the lithium compound included in the composition is in an amorphous state. In some embodiments, the lithium compound included in the composition is in a crystalline state. In some embodiments, the lithium compound included in the composition is a mixture of amorphous and crystalline states.

In some embodiments, the composition comprises, consists essentially of, or consists of a reaction product of nitridation of Li metal, followed by annealing. In some embodiments, the composition comprises, consists essentially of, or consists of a reaction product of oxidation of Li metal, followed by annealing. In some embodiments, the composition comprises, consists essentially of, or consists of a reaction product of sulfidation of Li metal, followed by annealing. In some embodiments, the composition comprises, consists essentially of, or consists of a reaction product of halogenation of Li metal, followed by annealing.

In some embodiments, the composition is in a particulate form, such as including particles each including at least one lithium compound. In some embodiments, the particles have at least one lateral dimension in the range of about 1 nm to about 1 μm, or about 5 nm to about 800 nm, or about 10 nm to about 500 nm, or about 10 nm to about 300 nm, or about 50 nm to about 200 nm, or about 50 nm to about 100 nm. In some embodiments, the particles can be aggregated to form larger-sized secondary particles, such as having at least one lateral dimension of about 1 μm or greater.

In some embodiments, the compositions described herein, as cathode additives, have a Li ion storage capacity of at least about 400 mAh $g^{-1}$ or at least about 800 mAh $cm^{-3}$. In some embodiments, a cathode additive can release its stored Li ions below a maximum potential during cathode charge but intakes little or no Li ions at a minimum potential of cathode discharge. In some embodiments, the cathode additive does not have intolerable negative effects on the stability of electrode materials, electrolyte, and a whole battery cell.

In some embodiments, the cathode additive is substantially stable in ambient condition and compatible with industrial battery fabrication processes such as slurry mixing, coating and baking.

In some embodiments, the cathode additive has an open circuit voltage versus Li/Li$^+$ electrode of about 0.7 V or more, or about 1 V or more, or about 1.2 V or more, or about 1.3 V or more, or about 1.5 V or more, or about 1.7 V more.

In some embodiments, the cathode additive has a charge (Li ion extraction) specific capacity of about 450 mAh $g^{-1}$ or more, about 500 mAh $g^{-1}$ or more, or about 550 mAh $g^{-1}$ or more, or about 600 mAh $g^{-1}$ or more, or about 650 mAh $g^{-1}$ or more, for a first-cycle charge when a cathode potential is increased from an open circuit voltage to a charge cut-off potential versus Li/Li$^+$ electrode.

In some embodiments, the cathode additive has a discharge (Li ion insertion) specific capacity of about 200 mAh $g^{-1}$ or less, or about 100 mAh $g^{-1}$ or less, or about 50 mAh $g^{-1}$ or less, or about 25 mAh $g^{-1}$ or less, or about 10 mAh $g^{-1}$ or less, for a first-cycle discharge when a cathode potential is decreased from a high charge cut-off potential to a low discharge cut-off potential versus Li/Li$^+$ electrode.

Figure 35:
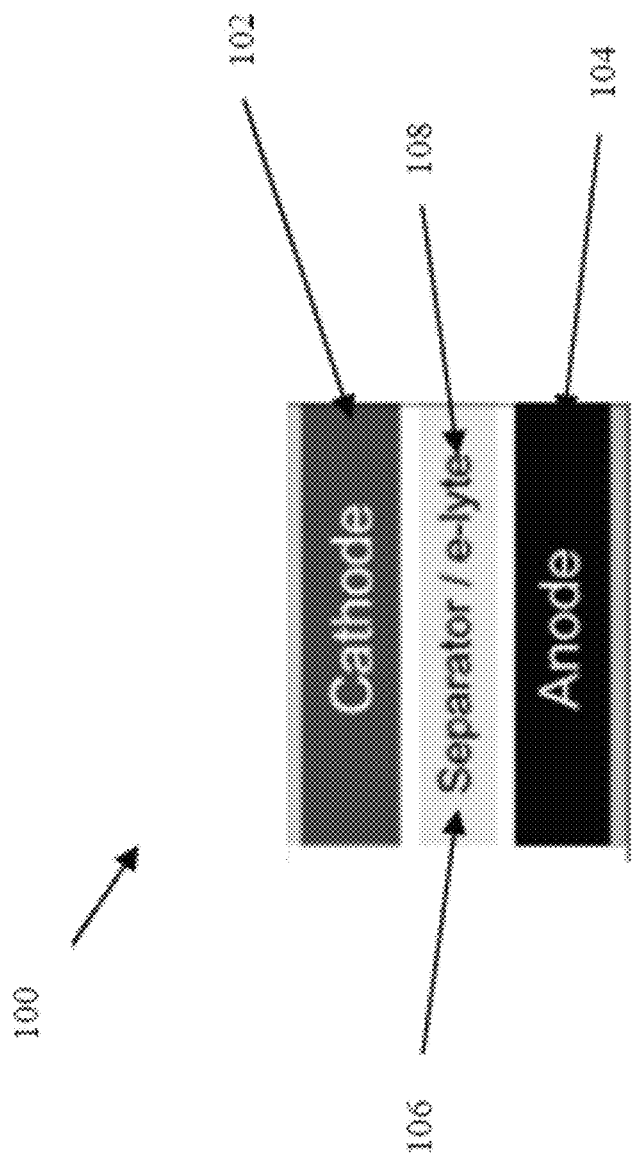
FIG. 35: Schematic of a Li-ion battery including a cathode additive.

Another aspect of some embodiments of this disclosure relates to a cathode including a composition of a cathode additive described herein, and a Li-ion battery including the cathode. As shown for some embodiments in FIG. 35, a Li-ion battery 100 includes a cathode 102, an anode 104, and a separator 106 that is disposed between the cathode 102 and the anode 104. The battery 100 also includes an electrolyte 108, which is disposed between the cathode 102 and the anode 104.

In some embodiments, the cathode 102 includes at least one cathode active material, such as one or more commercially available cathode active materials used for Li-ion batteries. In some embodiments, the cathode 102 includes lithium iron phosphate (e.g., $LiFePO_4$). In some embodiments, the cathode 102 includes lithium cobalt oxide (e.g., $LiCoO_2$). In some embodiments, the cathode 102 includes lithium manganese oxide (e.g., $LiMn_2O_4$). In some embodiments, the cathode 102 includes lithium nickel manganese cobalt oxide (e.g., $LiNi_xMn_yCo_zO_2$). In some embodiments, the cathode 102 includes one or more lithium-rich layered materials. In some embodiments, the cathode 102 includes lithium nickel cobalt aluminum oxide (e.g., $LiNi_xCo_y$-$Al_zO_2$). In some embodiments, the cathode 102 includes one or more of the following cathode active materials: lithium cobalt phosphate (e.g., $LiCoPO_4$), lithium manganese phosphate (e.g., $LiMnPO_4$), lithium nickel phosphate (e.g., $LiNiPO_4$), and lithium nickel manganese oxide (e.g., $LiNi_{1.5}Mn_{0.5}O_4$).

In some embodiments, the cathode 102 includes about 1 wt. % to about 20 wt. %, or about 1 wt. % to about 10 wt. %, or about 1 wt. % to about 8 wt. %, or about 2 wt. % to about 8 wt. %, or about 3 wt. % to about 8 wt. %, or about 3 wt. % to about 5 wt. % of a cathode additive, relative to a total weight of the cathode 102. In some embodiments, a remainder of the cathode 102 includes a cathode active material along with a binder and conductive additives. In some embodiments after initial charging, the cathode additive is partially or substantially fully delithiated to convert to a compound of at least one metal (previously included in metal nanostructures of the cathode additive) and at least one non-metal or metalloid (previously included in a matrix of the cathode additive), such as an element of Group 15 of the periodic table (e.g., N or P), Group 16 of the periodic table (e.g., O, S, Se, or Te), or Group 17 of the periodic table (e.g., F, Cl, Br, or I). In some embodiments after initial charging, the cathode additive is partially or substantially fully delithiated to convert to at least one of a metal oxide, a metal sulfide, a metal fluoride, a metal nitride, or a metal phosphide, and the cathode can comprise about 0.05 wt. % to about 20 wt. %, or about 0.1 wt. % to about 10 wt. %, or about 0.5 wt. % to about 8 wt. %, or about 1 wt. % to about 4 wt. % of the metal compound, along with potentially a remaining amount of the cathode additive. In some embodiments after initial charging, the cathode 102 includes one or more metal compounds selected from $Fe_3O_4$, $Fe_2O_3$, NiO, CoO, $Co_3O_4$, $Mn_3O_4$, $Mn_2O_3$, MnO, $MnO_2$, $MnO_3$, $PbO_2$, $RuO_2$, CuO, $Cu_2O$, SiO, $SiO_2$, $Al_2O_3$, $B_2O_3$, $P_2O_5$, $CoS_2$, and $CoF_3$.

In some embodiments, the inclusion of about 1 wt. % to about 10 wt. %, or about 1 wt. % to about 8 wt. %, or about 2 wt. % to about 8 wt. %, or about 3 wt. % to about 8 wt. %, or about 3 wt. % to about 5 wt. % of the cathode additive in the cathode 102 is sufficient to achieve a substantially complete Li compensation in the case of a $LiFePO_4$/graphite full cell with an initial irreversible Li loss of about 30 mAh $g^{-1}$. In some embodiments, the inclusion of about 1 wt. % to about 10 wt. %, or about 1 wt. % to about 8 wt. %, or about 2 wt. % to about 8 wt. %, or about 3 wt. % to about 8 wt. %, or about 3 wt. % to about 5 wt. % of the cathode additive is sufficient to achieve a substantially complete Li compensation for other cathode and anode material combinations.

In some embodiments, the inclusion of the cathode additive increases the energy density of the cathode 102 by at least about 5 wt. %, or at least about 10 wt. %, or at least about 12 wt. %, in comparison to using additional amount of a cathode active material in the case of a $LiFePO_4$/graphite cell with an initial irreversible Li loss of about 30 mAh $g^{-1}$. In some embodiments, the inclusion of the cathode additive increases the energy density of the cathode 102 by at least about 5 vol. %, or at least about 10 vol. %, or at least about 12 vol. %, in comparison to using additional amount of cathode active material in the case of other cathode and anode material combinations.

In some embodiments, the cathode 102 has a first-cycle specific charge capacity that is at least about 2%, or at least about 3%, or at least about 5%, or at least about 10%, or at least about 15%, or at least about 20% higher than a corresponding cathode without the cathode additive.

In some embodiments, the anode 104 includes carbon. In some embodiments, the anode 104 includes graphite or graphitic carbon. In some embodiments, the anode 104 includes graphene. In some embodiments, the anode 104 includes graphene oxide. In some embodiments, the anode 104 includes hard carbon. In some embodiments, the anode 104 includes silicon. In some embodiments, the anode 104 includes silicon monoxide. In some embodiments, the anode 104 includes silicon dioxide. In some embodiments, the anode 104 includes tin. In some embodiments, the anode 104 includes tin oxide. In some embodiments, the anode 104 includes a mixture of carbon and silicon. In some embodiments, the anode 104 includes a mixture of graphite and silicon. In some embodiments, the anode 104 includes a mixture of graphite and silicon monoxide. In some embodiments, the anode 104 includes a mixture of graphene and silicon.

In some embodiments, the Li-ion battery 100 has a reversible discharge capacity that is at least about 2%, or at least about 3%, or at least about 5%, or at least about 10%, or at least about 15%, or at least about 20% higher than a corresponding Li-ion battery without the cathode additive.

A further aspect of some embodiments of this disclosure relates to a method of forming a composition of a cathode additive described herein, and a method of forming a cathode and a Li-ion battery including the cathode additive.

In some embodiments, a method of forming a cathode additive includes reacting (a) molten Li metal with (b) a compound of at least one metal and at least one non-metal or metalloid, where the metal is selected from: transition metals; post-transition metals; metalloids; and lanthanides, and the non-metal or metalloid is selected from elements of: Group 15 of the periodic table (e.g., N or P); Group 16 of the periodic table (e.g., O, S, Se, or Te); and Group 17 of the periodic table (e.g., F, Cl, Br, or I). In some embodiments, molten Li metal is reacted with at least one metal compound selected from a metal oxide, a metal sulfide, a metal halide, a metal nitride, and a metal phosphide. In some embodiments, the method includes reacting molten Li metal with at least one transition metal oxide. In some embodiments, the method includes reacting molten Li metal with at least one transition metal sulfide. In some embodiments, the method includes reacting molten Li metal with at least one transition metal fluoride. In some embodiments, the method includes reacting molten Li metal with at least one post-transition metal oxide. In some embodiments, the method includes reacting molten Li metal with at least one post-transition metal sulfide. In some embodiments, the method includes reacting molten Li metal with at least one post-transition metal fluoride. In some embodiments, the method includes reacting molten Li metal with at least one metalloid oxide. In some embodiments, the method includes reacting molten Li metal with at least one metalloid sulfide. In some embodiments, the method includes reacting molten Li metal with at least one metalloid fluoride. In some embodiments, the method includes reacting molten Li metal with at least one metal compound selected from $Fe_3O_4$, $Fe_2O_3$, NiO, CoO, $Co_3O_4$, $Mn_3O_4$, $Mn_2O_3$, MnO, $MnO_2$, $MnO_3$, $PbO_2$, $RuO_2$, CuO, $Cu_2O$, SiO, $SiO_2$, $Al_2O_3$, $B_2O_3$, $P_2O_5$, $CoS_2$, and $CoF_3$.

In some embodiments, the method includes reacting molten Li metal with at least one metal compound under an inert atmosphere. In some embodiments, the method includes reacting molten Li metal with at least one metal compound under argon. In some embodiments, the method includes reacting molten Li metal with at least one metal compound under agitation, such as mechanical stirring.

In some embodiments, the method includes reacting molten Li metal with at least one metal compound at a temperature of about 180° C. to about 250° C. In some embodiments, the method includes reacting molten Li metal with at least one metal compound at a temperature of about 180° C. to about 220° C. In some embodiments, the method includes reacting molten Li metal with at least one metal compound at a temperature of about 185° C. to about 200° C. In some embodiments, the method includes reacting molten Li metal with at least one metal compound at a temperature above about 250° C.

In other embodiments, a method of forming a composition of a cathode additive includes mechanical mixing or ball milling of at least one lithium compound and at least one metal (or non-metal). In some embodiments, the method includes mechanical mixing or ball milling of lithium oxide and at least one transition metal. In some embodiments, the method includes mechanical mixing or ball milling of lithium sulfide and at least one transition metal. In some embodiments, the method includes mechanical mixing or ball milling of lithium fluoride and at least one transition metal. In some embodiments, the method includes mechanical mixing or ball milling of lithium oxide and at least one post-transition metal. In some embodiments, the method includes mechanical mixing or ball milling of lithium sulfide and at least one post-transition metal. In some embodiments, the method includes mechanical mixing or ball milling of lithium fluoride and at least one post-transition metal. In some embodiments, the method includes mechanical mixing or ball milling of lithium oxide and at least one metalloid. In some embodiments, the method includes mechanical mixing or ball milling of lithium sulfide and at least one metalloid. In some embodiments, the method includes mechanical mixing or ball milling of lithium fluoride and at least one metalloid.

In yet other embodiments, a method of forming a composition of a cathode additive includes reacting (a) solid Li metal with (b) at least one non-metal or metalloid, where the non-metal or metalloid is selected from elements of: Group 15 of the periodic table (e.g., N or P); Group 16 of the periodic table (e.g., O, S, Se, or Te); and Group 17 of the periodic table (e.g., F, Cl, Br, or I). In some embodiments, solid Li metal is exposed to an atmosphere of at least one non-metal, followed by annealing and grinding (or other manner of pulverization). In some embodiments, solid Li metal is exposed to a nitrogen atmosphere, followed by annealing and grinding (or other manner of pulverization). In some embodiments, exposure to an atmosphere of at least one non-metal is performed for a time duration of about 1 day to about 10 days, or about 1 day to about 5 days, or about 2 days to about 4 days. In some embodiments, annealing is performed at a temperature of about 130° C. to about 250° C., or about 150° C. to about 220° C., or about 150° C. to about 200° C., and for a time duration of about 6 hours to about 2 days, or about 12 hours to about 2 days, or about 1 day.

Once a composition of a cathode additive is formed as described herein, the cathode additive can be used in a method of forming a cathode and a Li-ion battery including the cathode additive. In some embodiments, a method includes combining the cathode additive with a cathode active material, a binder, and conductive additives to form a mixture, such as in the form of a slurry, and applying the mixture to a current collector to form a cathode. In some embodiments, a weight ratio of the cathode additive relative to the cathode active material is about 1/79 to about 1/3, or about 1/79 to about 1/7, or about 1/79 to about 1/9, or about 1/39 to about 1/9, or about 3/77 to about 1/9, or about 3/77 to about 1/15. In some embodiments, the method further includes combining the cathode with an anode, a separator, and an electrolyte to form a battery. In some embodiments, the method further includes subjecting the cathode (or the battery) to at least one initial charge cycle.

EXAMPLES

The following examples describe specific aspects of some embodiments of this disclosure to illustrate and provide a description for those of ordinary skill in the art. The examples should not be construed as limiting this disclosure, as the examples merely provide specific methodology useful in understanding and practicing some embodiments of this disclosure.

Figure 6:
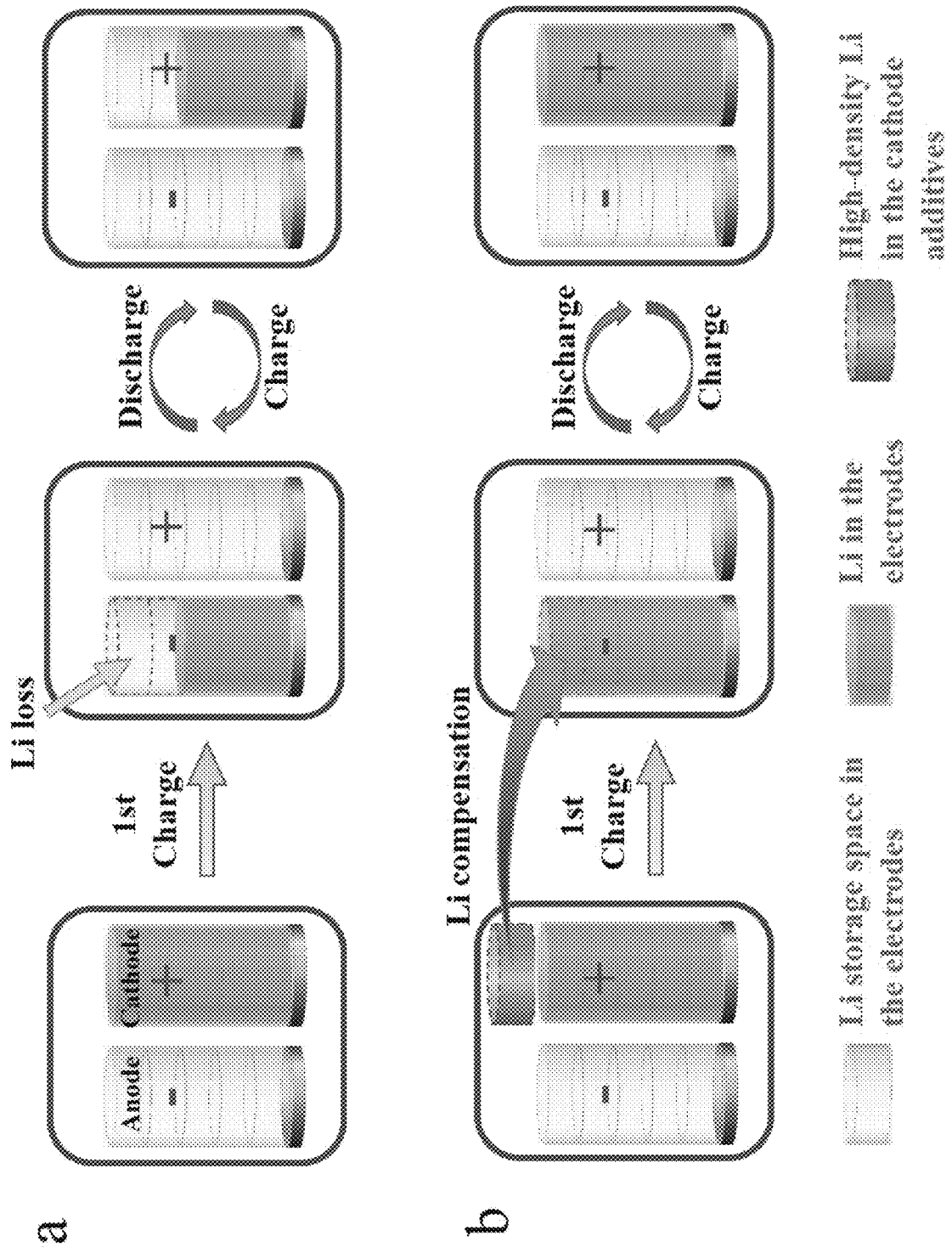
FIG. 6: Schematic representation of a lithium-ion battery with a high-capacity cathode additive. a,b, Schematic of the lithium-ion battery operating (a) without and (b) with a cathode additive. The initial irreversible reaction consumes Li ion from the cathode, leading to a high irreversible capacity. A high-capacity cathode additive can compensate the lithium loss in the initial cycle and maximize the energy and specific energy of the lithium-ion battery.

To search for an effective cathode prelithiation additive, the following points can serve as guidelines. First, a good cathode additive should possess a much higher Li storage capacity by weight and volume than existing cathode materials (FIG. 6). For example, if doubling of the capacity of existing cathode materials was chosen as a criterion, a desirable prelithiation additive should have capacity >about 400 mAh $g^{-1}$ or >about 1200 mAh $cm^{-3}$. Second, the additive should be able to release its stored Li ions below the maximum potential during cathode charge but does not intake Li ion at the minimum potential of cathode discharge (FIG. 1a). That is, the delithiation potential of the additive should be below the maximum cathode charge potential, while the lithiation potential of the additive should be below the minimum cathode discharge potential. This implies that the delithiation/lithiation potential curve of the additive should have a large hysteresis. Third, the cathode prelithiation additive should not have intolerable negative effects on the stability of electrode materials, electrolyte, and the whole battery cell. Usually, a relatively high open circuit voltage (OCV) is involved (FIG. 1a). Fourth, the cathode prelithiation additive should be stable in the ambient condition and compatible with current industrial battery fabrication processes such as slurry mixing, coating and curing.

$Li_2O$/Metal Nanocomposites

With the above guidelines, the reaction products of transition metal oxides (MOs) with Li were identified as excellent candidates for cathode prelithiation additives. MOs ($M_xO_y$, M=Fe, Co, Ni, Mn, and so forth) can react with Li through a conversion reaction mechanism ($M_xO_y$+2yLi$^+$+2ye$^-$→xM+yLi$_2$O) to form nanocomposites of M and $Li_2O$. The M/$Li_2O$ nanocomposites store more than about four times the theoretical specific capacity of existing cathodes (e.g., about 724 mAh $g^{-1}$ for Co/$Li_2O$ (molar ratio, about 3/4), about 799 mAh $g^{-1}$ for Fe/$Li_2O$ (molar ratio, about 2/3), and about 935 mAh $g^{-1}$ for Mn/$Li_2O$ (molar ratio, about 1/2), see FIG. 1b and FIG. 5). Based on the density of M and $Li_2O$, the nanocomposites can also deliver high volumetric capacities (e.g., about 2695 mAh $cm^{-3}$ for Co/$Li_2O$ (molar ratio, about 3/4), about 2735 mAh $cm^{-3}$ for Fe/$Li_2O$ (molar ratio, about 2/3) and about 2891 mAh $cm^{-3}$ for Mn/$Li_2O$ (molar ratio, about 1/2), see FIG. 1b and FIG. 5).

Figure 7:
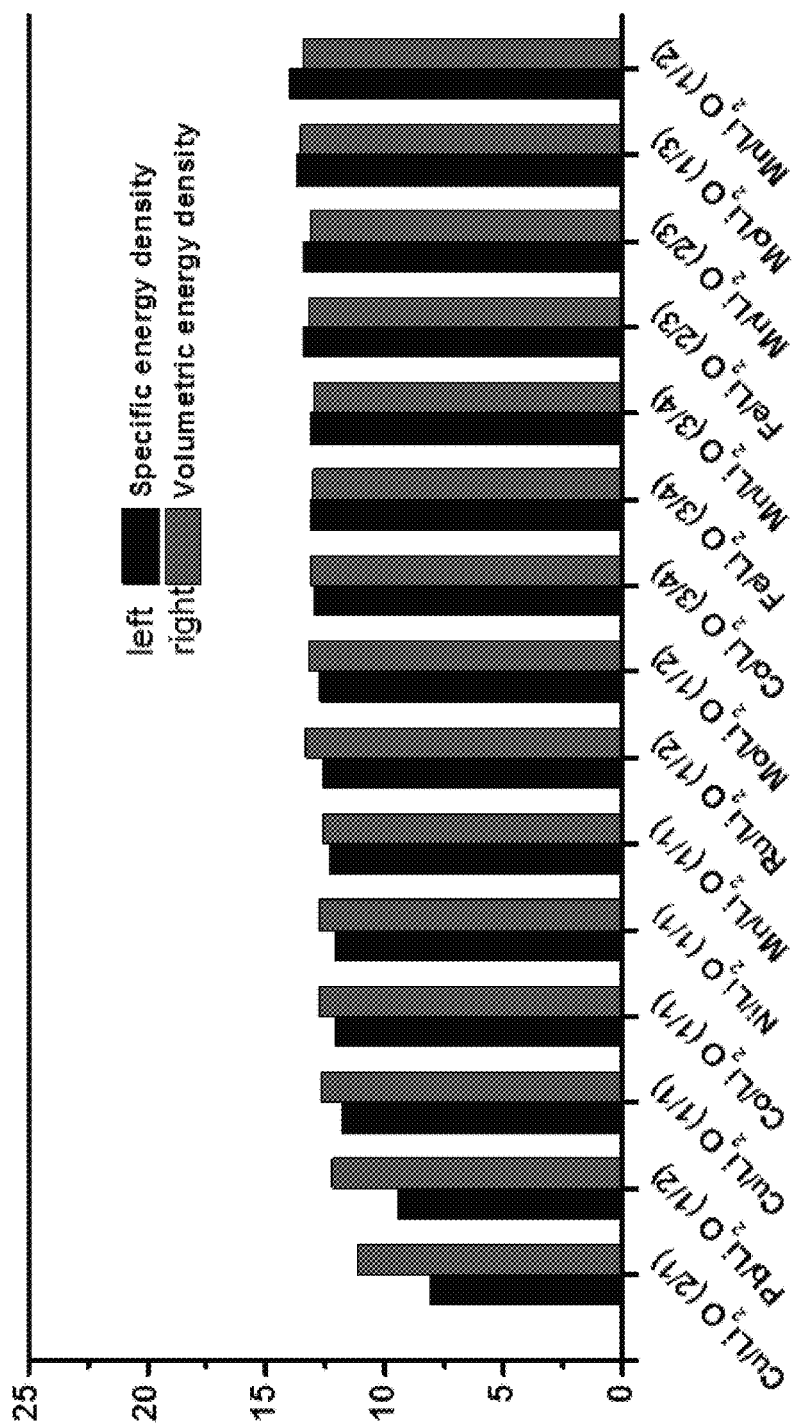
FIG. 7: The increased energy density using various M/Li$_2$O cathode prelithiation additives. To achieve a substantially complete lithium compensation in a Li-ion battery, M/Li$_2$O composites can be used as cathode prelithiation additives. The energy density of the cathode increases in comparison to that of using extra amount of cathode materials (in the case of LiFePO$_4$/graphite cell with an initial irreversible lithium loss of about 30 mAh g$^{-1}$).

The conversion reactions of MOs usually exhibit a lithiation potential below about 1.2 V and a near complete delithiation at a potential below about 3 V, which shows a large charge/discharge voltage hysteresis. For example, FIG. 1c shows experimental electrochemical lithiation/delithiation voltage curve of $Co_3O_4$, where lithiation mainly takes place between about 1.2 V to about 0.01 V, and delithiation can provide a very high Li ion capacity of about 842 mAh $g^{-1}$ below about 3 V. The wide spread of voltage range and large hysteresis make conversion oxides themselves not ideal either as anode or cathode materials. But these materials can be excellent prelithiation additives for cathodes. The charge cut-off potential of current cathode materials is usually larger than about 4.0 V vs. Li/Li$^+$ (e.g., about 4.2 V for LiFePO$_4$ and about 4.3 V for LiCoO$_2$, FIG. 1c), which is high enough to readily extract Li from the M/$Li_2O$ nanocomposites. Meanwhile, their discharge cut-off potential is higher than about 2.5 V (e.g., about 2.5 V for LiFePO$_4$ and about 3.0 V for LiCoO$_2$, FIG. 1c), which is still much higher than the lithiation potential of MOs. In other words, M/$Li_2O$ composites as cathode additives can contribute a large amount of Li during the first charge process of cathodes, while their lithiation reaction is unlikely to occur upon the cathode discharge process. The impact of having M/$Li_2O$ nanocomposites as prelithiation additives can be shown in FIG. 1d, which plots the amount of additional materials in order to compensate the first cycle Li loss (e.g., about 30 mAh $g^{-1}$) in a LiFePO$_4$/graphite full cell, where an additional about 18% (by weight) of LiFePO$_4$ cathode material would have to be loaded. In sharp contrast, about 3-5% (by weight) of M/$Li_2O$ cathode additive is involved to offset this initial Li loss (FIG. 1d). Correspondingly, the specific and volumetric energy densities are increased by about 8-13% and 11-14%, respectively (FIG. 1d and FIG. 7).

Figure 2:
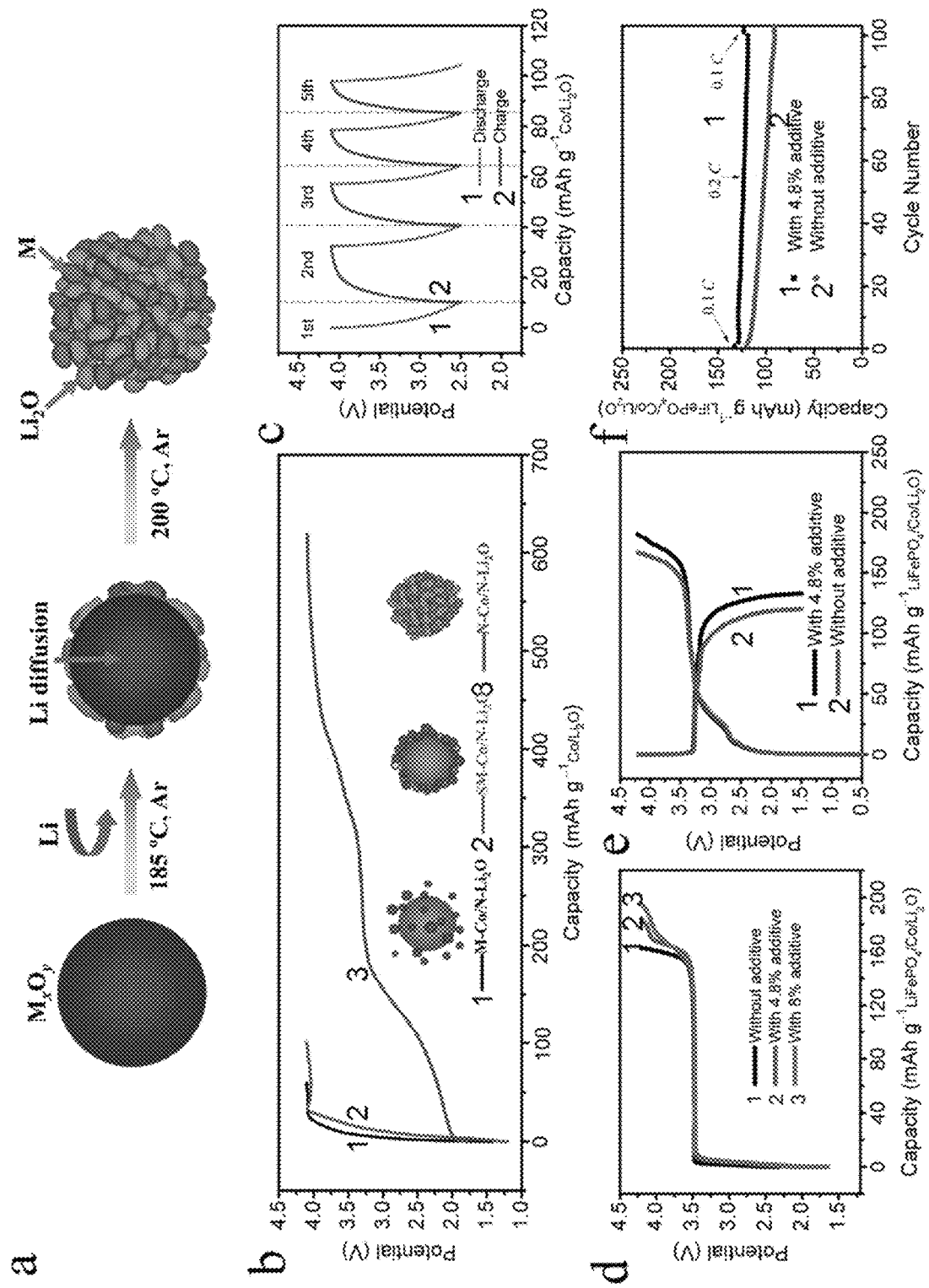
FIG. 2: Fabrication and electrochemical characteristics of nanometer-sized Co/nanometer-sized $Li_2O$ (N—Co/N—$Li_2O$) nanocomposite. a, Schematic of the fabrication process of N-M/N—$Li_2O$ nanocomposites. MOs are used as the starting materials and in situ converted into N-M/N—$Li_2O$ composites via the chemical reaction with molten lithium. b, The initial charge potential profiles of electrodes produced with various Co/$Li_2O$ nanocomposites: micrometer-sized Co/nanometer-sized $Li_2O$ (M-Co/N—$Li_2O$) composite, sub-micrometer-sized Co/nanometer-sized $Li_2O$ (SM-Co/N—$Li_2O$) and N—Co/N—$Li_2O$ nanocomposite. c, The charge/discharge profiles of the N—Co/N—$Li_2O$ electrode after the first charge process. d, The initial charge potential profiles of the $LiFePO_4$ electrodes with different amounts of the N—Co/N—$Li_2O$ additive. e,f, The initial charge/discharge potential profiles (e) and cycling performance (f) of $LiFePO_4$/graphite full cells with and without the N—Co/N—$Li_2O$ additive. The specific capacities of the cathodes are evaluated based the weight of $LiFePO_4$ and the N—Co/N—$Li_2O$ additive.

The concept of using M/Li$_2$O nanocomposites as cathode prelithiation additives has been experimentally demonstrated. In particular, a general one-step synthesis method was developed for producing M/Li$_2$O (M: Co, Fe, Ni, and so forth) nanocomposites (FIG. 2a), which show successful application as cathode additives to effectively compensate the Li loss during the first charge process in Li-ion batteries. Nanometer-sized metal/nanometer-sized Li oxide (N-M/N—Li$_2$O) nanocomposite was synthesized by mixing M$_x$O$_y$, with molten Li under Ar atmosphere. The molar ratio of the starting MA, and Li was set according to the conversion reaction equation (M$_x$O$_y$+2yLi→xM+yLi$_2$O). Li metal foil was melted at about 185° C. and reacted with M$_x$O$_y$ for about 20 minutes under mechanical stirring. Then, the temperature was further increased to about 200° C. and kept for about 2 hours for substantially complete reaction. Finally, a substantially uniform nanocomposite, comprising of nanometer-sized M particles embedded in a matrix of nanometer-sized Li$_2$O particles, was obtained (FIG. 2a). These M/Li$_2$O nancomposites are used in regular slurry processing in ambient conditions to form battery electrodes.

As a typical example, the electrochemical performances of nanometer-sized Co/nanometer-sized Li$_2$O (N—Co/N—Li$_2$O; molar ratio, about 3/4) nanocomposite were investigated (FIGS. 2b and c). The as-prepared N—Co/N—Li$_2$O nanocomposite delivered a high charge specific capacity of about 619 mAh g$^{-1}$ and a low discharge specific capacity of about 10 mAh g$^{-1}$ for the first cycle in the potential range between about 4.1 V and about 2.5 V, meeting the voltage criteria as a prelithiation additive. For comparison, electrochemical properties of two other Co/Li$_2$O nanocomposites, including micrometer-sized Co/nanometer-sized Li$_2$O (M-Co/N—Li$_2$O) and sub-micrometer-sized Co/nanometer-sized Li$_2$O (SM-Co/N—Li$_2$O) composites were also investigated (FIG. 2b). These composites exhibited a much higher charge potential (about 4.1 V) and a lower specific charge capacity (<about 100 mAh g$^{-1}$), due to the large particle size of Co and the loose contact between Li$_2$O and Co particles (discussed later). These results highlight the importance of having deep nanoscale mixing of Co and Li$_2$O in this example.

The Li-extraction potential of the N—Co/N—Li$_2$O nanocomposite produced by the one-step chemical reaction (FIG. 2b) is slightly higher than that produced by the electrochemical lithiation product of Co$_3$O$_4$ (FIG. 1c). This might result from the different grain sizes of Co/Li$_2$O nanocomposites produced by these two methods. In contrast to the counterpart produced by the electrochemical lithiation (FIG. 1c), the chemically synthesized N—Co/N—Li$_2$O composite exhibits a high OCV of about 1.8 V (FIG. 2b), which is high enough to be in the stability range of current cathode materials. Thus it can be readily mixed with various cathode materials with negligible negative effect on their chemical and structural stability during electrode processing. Moreover, the N—Co/N—Li$_2$O electrode lost substantially all of its capacity after the first cycle, indicating that after providing Li ions during the first charge, these nanocomposites did not contribute to the active electrochemical process in the cathode (FIG. 2c). All of these characteristics allow the N—Co/N—Li$_2$O cathode additive to effectively compensate for the first-cycle capacity loss in Li-ion batteries.

FIG. 2d shows the charge potential profiles of LiFePO$_4$ cathode and Li metal anode half cells with different amounts of the N—Co/N—Li$_2$O cathode prelithiation material. Here, the specific capacity was calculated based on the total weight of LiFePO$_4$ and the N—Co/N—Li$_2$O nanocomposite unless otherwise stated. The electrode composed of pristine commercial LiFePO$_4$ powder delivers an initial charge capacity of about 164 mAh g$^{-1}$. With about 4.8% (by weight) of the N—Co/N—Li$_2$O additive (based on the entire cathode), the first-cycle specific charge capacity reaches about 183 mAh g$^{-1}$ (about 12% higher). When about 8% (by weight) of the N—Co/N—Li$_2$O additive is used, the initial specific charge capacity is as high as about 195 mAh g$^{-1}$ (about 19% higher). A potential slope above the charge plateau of the pristine LiFePO$_4$ is clearly observed, which is consistent with the delithiation process of the pristine N—Co/N—Li$_2$O composite (FIGS. 2b and 2d). Meanwhile, the LiFePO$_4$ cathodes with and without the N—Co/N—Li$_2$O additive in lithium metal half cells showed high specific discharge capacity and stable cycling performance (FIG. 8), indicating that the N—Co/N—Li$_2$O additive has negligible negative effect on the stability of the cathode during cycling.

Figure 8:
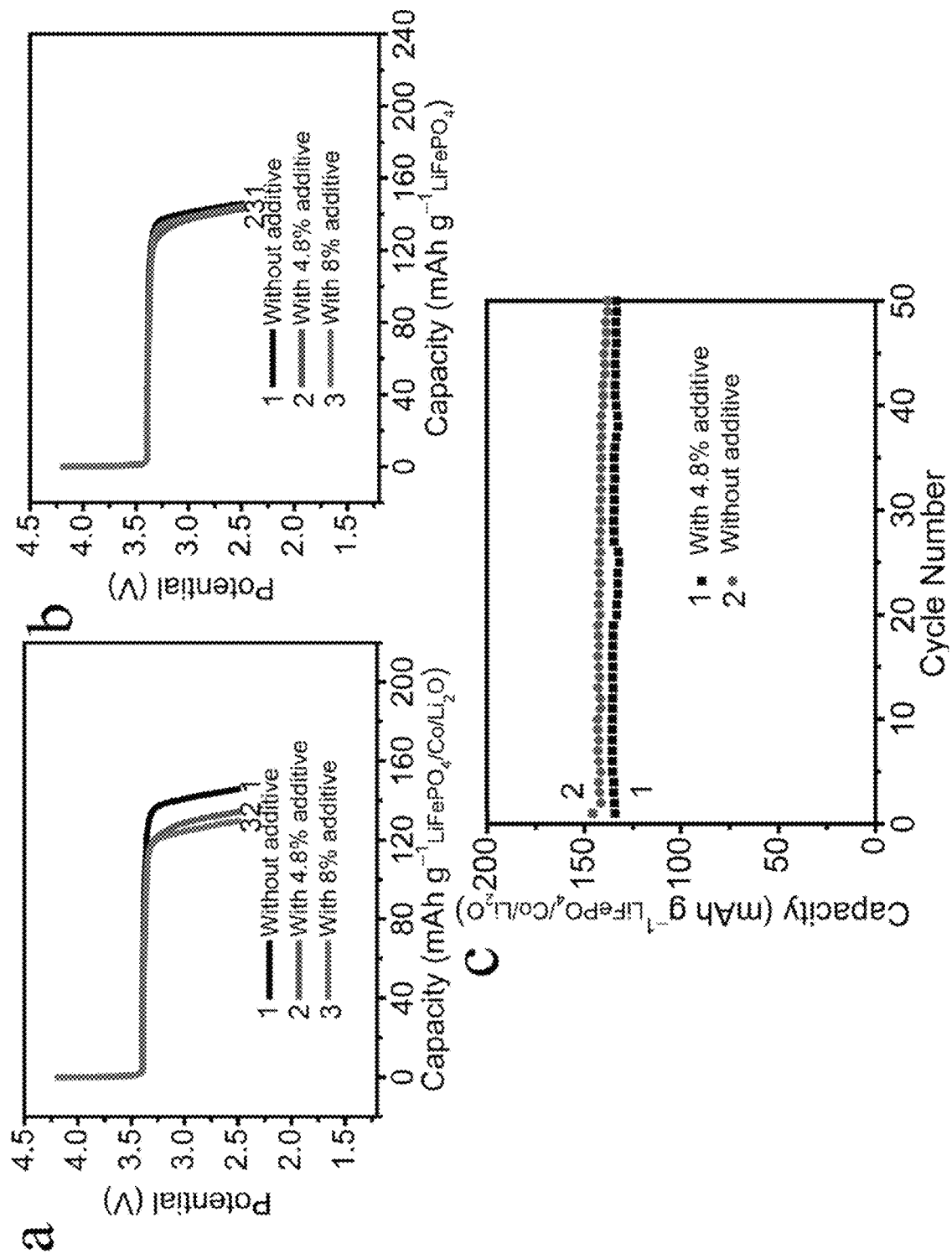
FIG. 8: The initial discharge potential profiles and cycling stability of LiFePO$_4$ cathode with and without N—Co/N—Li$_2$O additive. a,b, The initial discharge potential profiles of LiFePO$_4$ cathode with the N—Co/N—Li$_2$O additive (a) based on the weight of LiFePO$_4$ and the N—Co/N—Li$_2$O nanocomposite and (b) based on the weight of LiFePO$_4$. c, Cycling performance of the LiFePO$_4$ cathode with and without the N—Co/N—Li$_2$O additive based on the weight of LiFePO$_4$ and the N—Co/N—Li$_2$O nanocomposite. In spite of the differences in charge potential curves, LiFePO$_4$ cathode with different amounts of the N—Co/N—Li$_2$O additive shows similar first-cycle discharge potential curves (FIG. 8a). With the addition of the N—Co/N—Li$_2$O nanocomposite, the specific discharge capacities of the hybrid cathodes are slightly reduced, since it contributes negligible discharge capacity above the cut-off potential of LiFePO$_4$ (FIG. 2c). The LiFePO$_4$ cathode with about 4.8% (by weight) of the N—Co/N—Li$_2$O additive delivers a specific discharge capacity of about 134 mAh g$^{-1}$ based on the weight of LiFePO$_4$ and the N—Co/N—Li$_2$O nanocomposite. When normalized by the weight of LiFePO$_4$, the cathode exhibits substantially the same specific discharge capacity (about 143 mAh g$^{-1}$) and potential curves to its pristine counterpart (FIG. 8b), indicating that the addition of the N—Co/N—Li$_2$O nanocomposite does not yield noticeable negative effect on the specific capacity of the cathode material. Meanwhile, the LiFePO$_4$ cathode with and without the N—Co/N—Li$_2$O additive showed stable cycling performance (FIG. 8c). These results indicate that the N—Co/N—Li$_2$O additive has negligible negative effect on the stability of the cathode during cycling.
Figure 9:
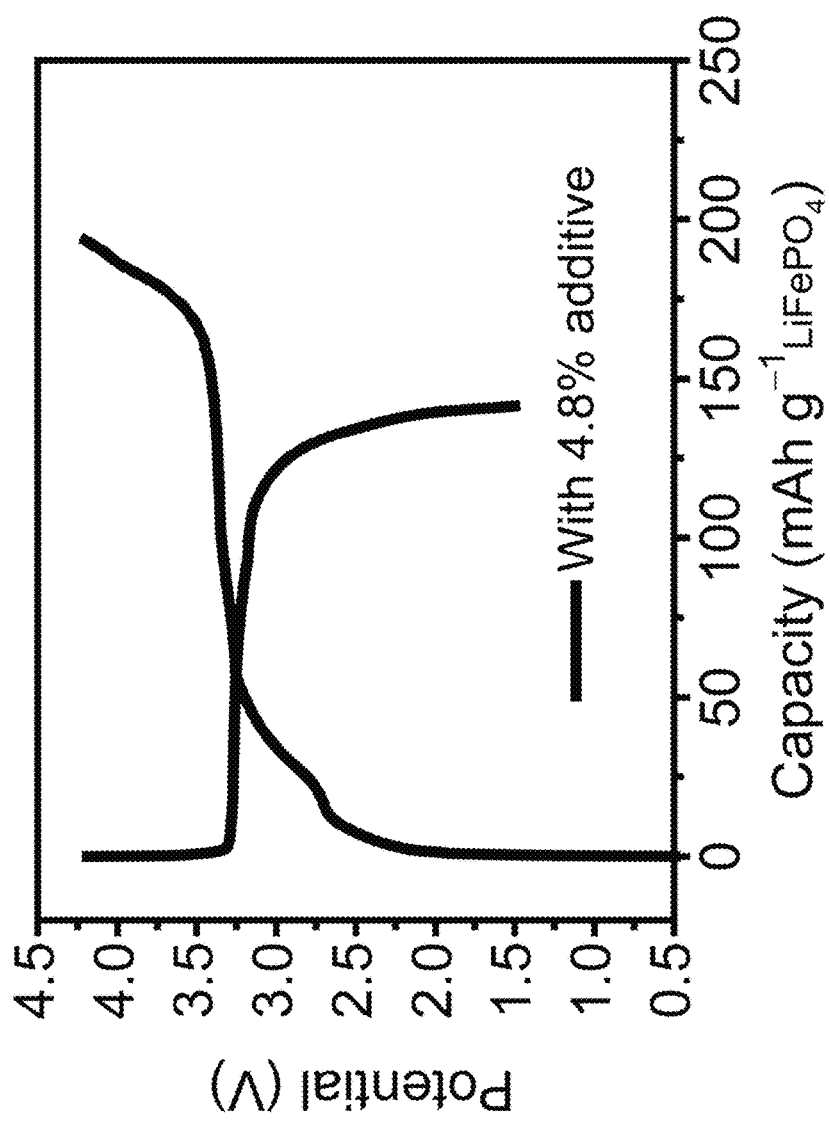
FIG. 9: The initial discharge potential profiles of LiFePO$_4$/graphite full cells with about 4.8% (by weight) of N—Co/N—Li$_2$O additive evaluated based on the weight of LiFePO$_4$.
Figure 10:
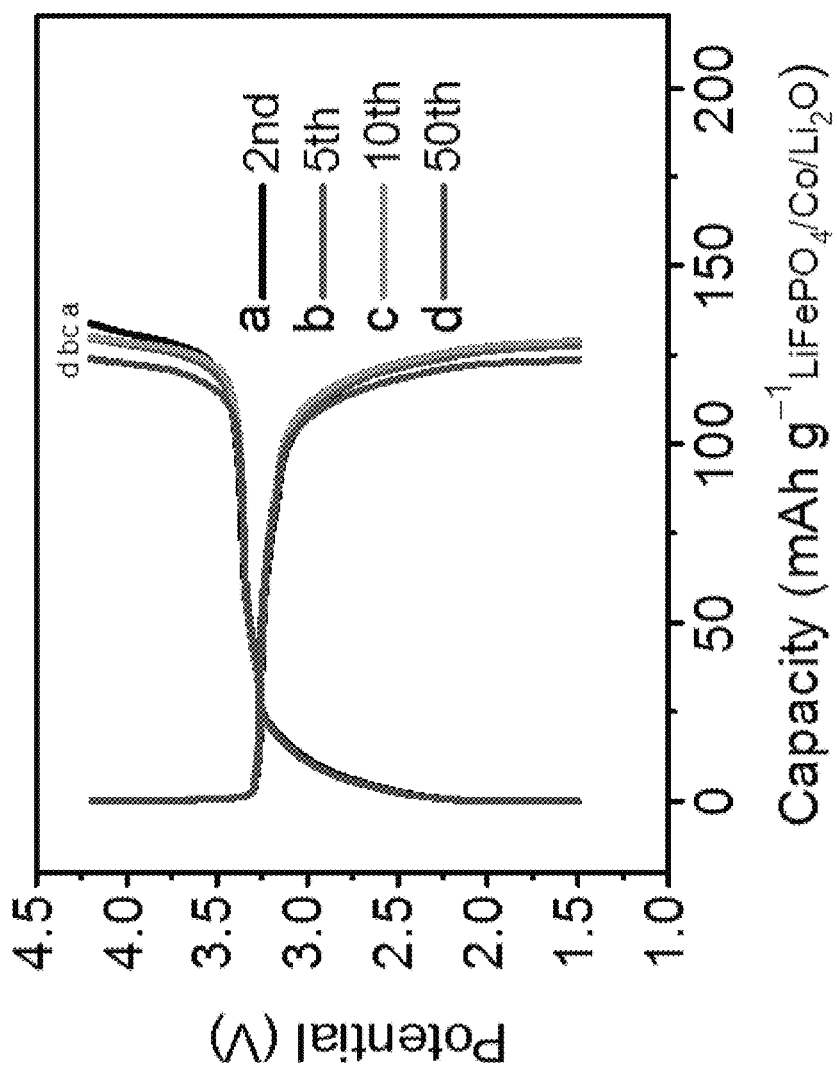
FIG. 10: The charge/discharge potential profiles of a LiFePO$_4$/graphite full cell with about 4.8% (by weight) of N—Co/N—Li$_2$O additive upon cycling.

In a full cell, substantially all Li comes from a cathode material. Due to the irreversible reaction during the first-cycle charge process, a certain amount of lithium is unlikely to revert to the cathode material during the discharge process, which reduces the specific energy and energy density of a battery. Ideally, when the amount of the cathode additive is optimized, the discharge capacity of a cathode in a full cell can reach the same value as that obtained in a Li half cell. To further evaluate the Li compensation effect of the N—Co/N—Li$_2$O composite, the electrochemical characterizations of LiFePO$_4$/graphite full cells were carried out. As shown in FIG. 2e, the reversible discharge capacity of the as-made pristine LiFePO$_4$/graphite full cell without the N—Co/N—Li$_2$O cathode additive is about 120 mAh g$^{-1}$. In comparison, a LiFePO$_4$/graphite full cell with about 4.8 wt. % of N—Co/N—Li$_2$O cathode additive in the cathode delivers a reversible discharge capacity of about 133 mAh g$^{-1}$ (about 11% higher) based on the weight of LiFePO$_4$ and the N—Co/N—Li$_2$O composite, which is the same value as that achieved in a LiFePO$_4$/Li half cell (FIG. 8). When calculated based on the weight of LiFePO$_4$, the reversible discharge capacity is as high as about 141 mAh g$^{-1}$ (FIG. 9). The first-cycle charge potential profiles of the LiFePO$_4$/graphite full cell with and without the N—Co/N—Li$_2$O additive coincide well at a low charge potential (<about 3.3 V), and a prolonged charge plateau and slope are observed for the cell with the Co/Li$_2$O cathode additive at a high charge potential (>about 3.3 V). Correspondingly, the cell with the cathode additive shows a prolonged plateau during the discharge progress. These results confirm that the first-cycle capacity loss of a full cell is effectively compensated by the released capacity from the N—Co/N—Li$_2$O additive. The overall capacity and energy density of the entire lithium-ion battery are appreciably improved. Furthermore, the full cell with about 4.8% (by weight) of the cathode additive exhibits stable potential curves upon cycling and significantly enhanced capacity retention with a small average capacity decay of about 0.07% per cycle in 100 cycles (FIG. 2f and FIG. 10), which has comparable or better stability than the reference pristine LiFePO$_4$/graphite full cell without the N—Co/N—Li$_2$O additive.

Figure 3:
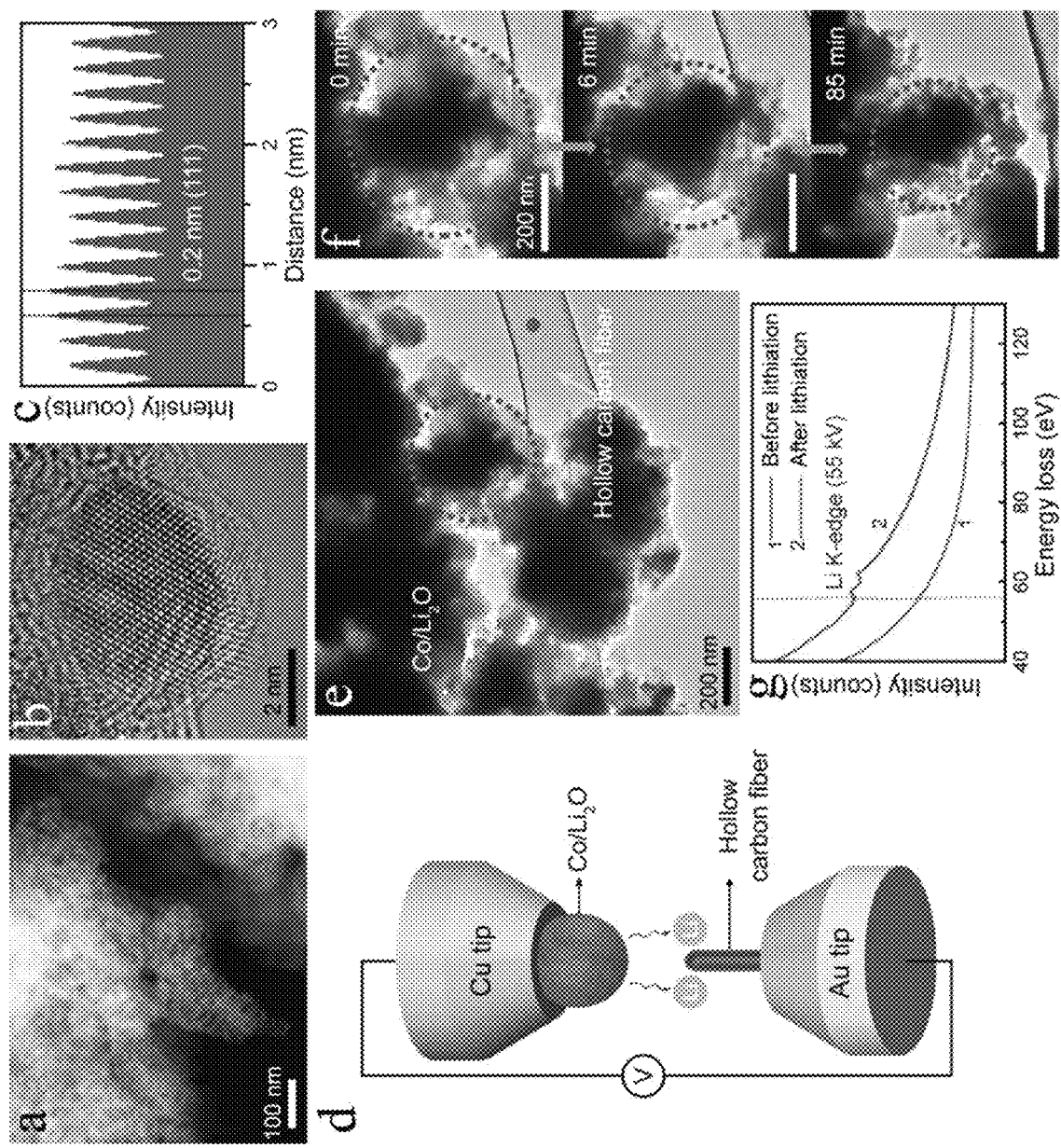
FIG. 3: Structure and evolution of N—Co/N—$Li_2O$ nanocomposite upon lithium-extraction process. a, Scanning transmission electron microscopy (STEM) image of the N—Co/N—$Li_2O$ nanocomposite showing that Co nanoparticles are substantially uniformly embedded in a $Li_2O$ matrix. b,c, A high resolution TEM (HRTEM) image (b) and the corresponding fringes of a Co nanoparticle (c), showing its crystallinity and the small particle size. d,e, Schematic illustration (d) and configuration (e) of an in-situ TEM device. The N—Co/N—$Li_2O$ nanocomposite on a Cu tip serves as the working electrode and a template-fabricated hollow carbon fiber functions as the counter electrode. f,g, Time-lapse TEM images (f) and electron energy loss spectroscopy (EELS) spectra (g). After voltage bias application, lithium is extracted from the N—Co/N—Li$_2$O working electrode and transfers to the carbon counter electrode, leading to the volume shrinkage. An N—Co/N—Li$_2$O particle aggregate is labelled by a dotted circle and its shrinkage in volume is observed. EELS spectra are taken at the hollow carbon fiber, labelled by a filled circle in (e), before and after the delithiation of the N—Co/N—Li$_2$O nanocomposite. The results indicate the transfer of lithium from the working electrode to the counter electrode.
Figure 11:
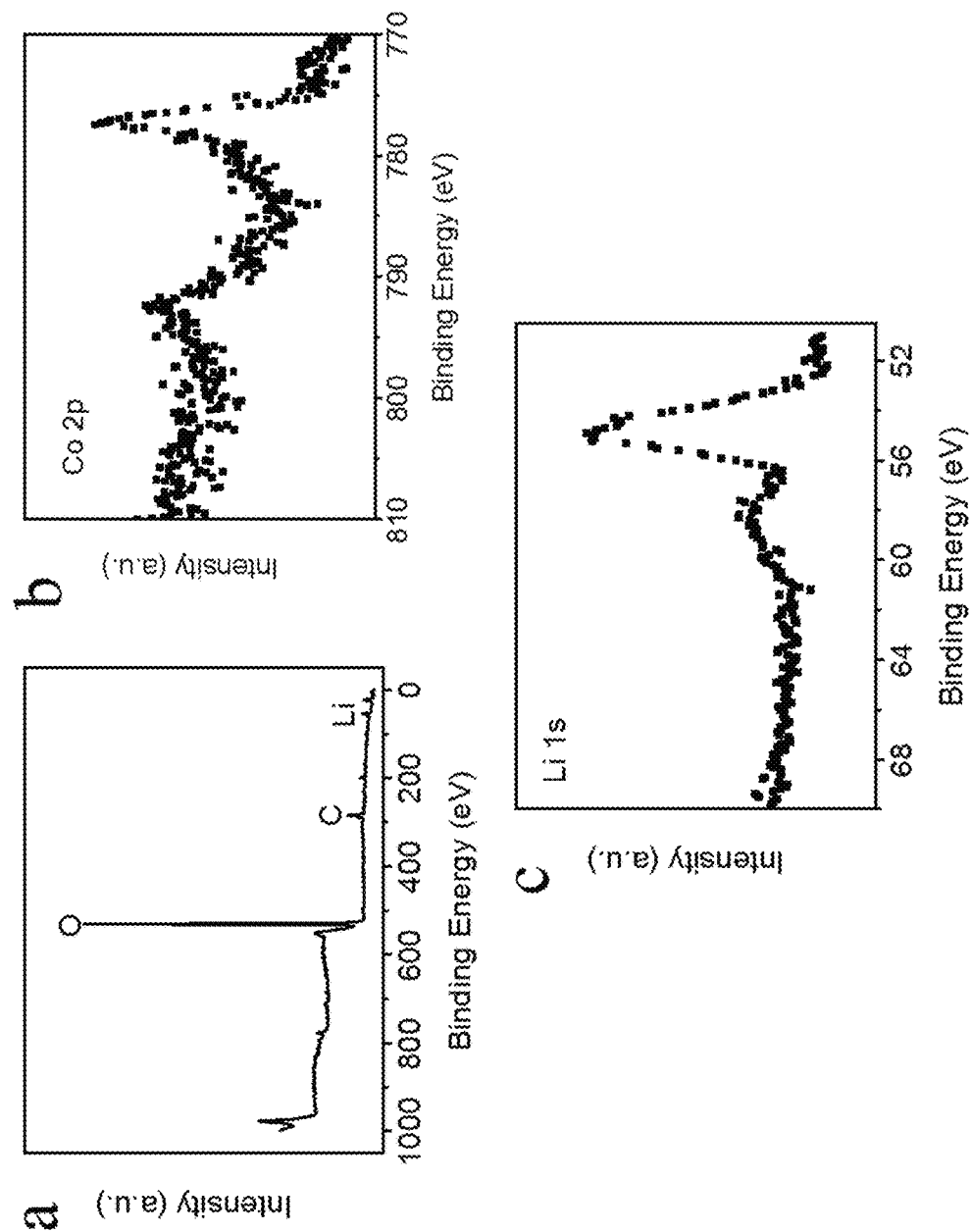
FIG. 11: X-ray photoelectron spectroscopy (XPS) results for N—Co/N—Li$_2$O nanocomposite. a, Survey XPS spectrum. b,c, High-resolution spectra of (b) Co 2p and (c) Li 1s. The survey XPS spectrum verifies that the element compositions of the nanocomposite are O, Co and Li (FIG. 11a). The high-resolution Co 2p spectrum shows two peaks at about 792.4 and about 777.3 eV, corresponding to the Co 2p$_{1/2}$ and Co 2p$_{3/2}$ spin-orbit peaks of Co (FIG. 11b). The high-resolution XPS Li 1s spectrum indicates the existence of Li$_2$O (FIG. 11c). Thus, the existence of metallic Co and Li$_2$O in the product is confirmed.
Figure 12:
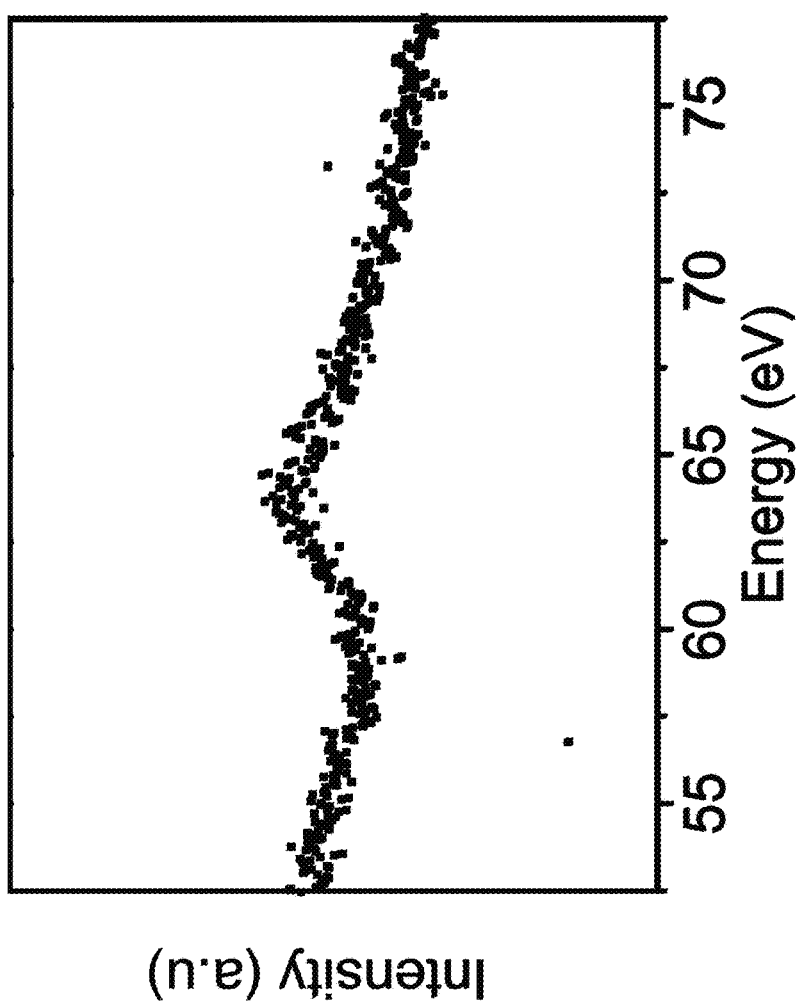
FIG. 12: EELS spectrum for N—Co/N—Li$_2$O composite: Li K-edge, near-edge fine structure. Due to the high ionization cross-section of the shallow Li K-edge, EELS is appropriate for spectroscopy and mapping of lithium. The existence of Li$_2$O is confirmed.
Figure 13:
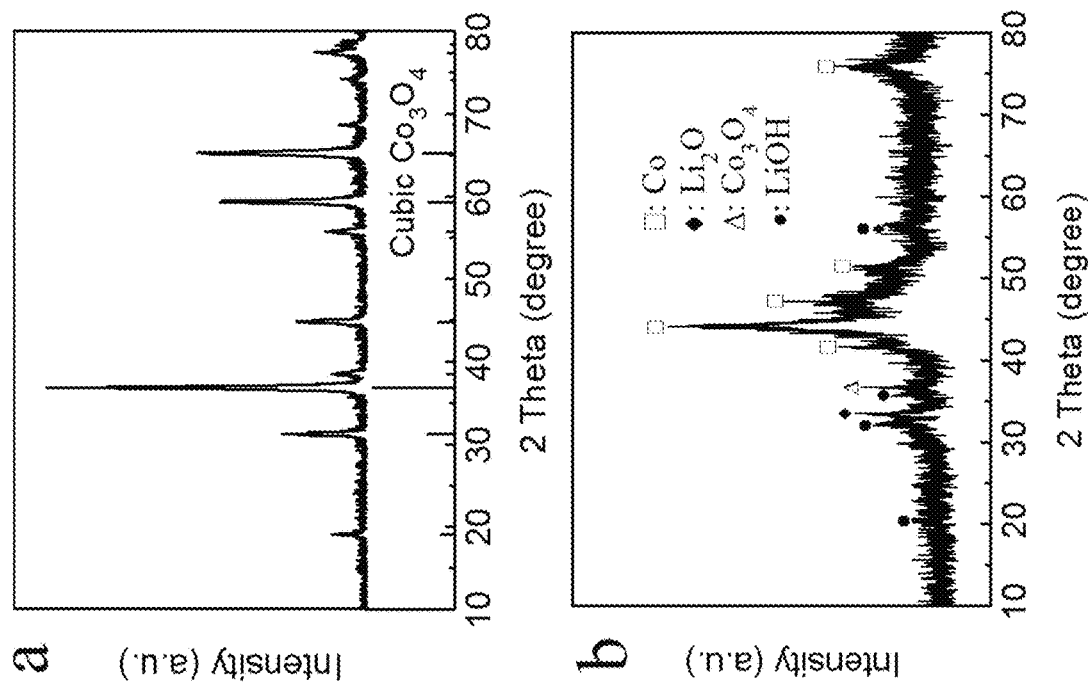
FIG. 13: X-ray diffraction (XRD) pattern of (a) starting Co$_3$O$_4$ regent and (b) N—Co/N—Li$_2$O product. The XRD pattern provides crystallinity and phase information of the product. After the reaction between Co$_3$O$_4$ and lithium, the initial Co$_3$O$_4$ transformed into the N—Co/N—Li$_2$O nanocomposite. The crystalline Co nanoparticles are confirmed. Their particle size calculated by the Debye-Scherer equation is about 5 nm. There exist small bumps in the Li$_2$O peak positions, indicating its nearly amorphous nature. Small amount of residual Co$_3$O$_4$ is observed. The sample for XRD measurement was exposed to ambient condition for 5 weeks. Very weak XRD peaks for LiOH appears due to the reaction between Li$_2$O and H$_2$O in air.
Figure 14:
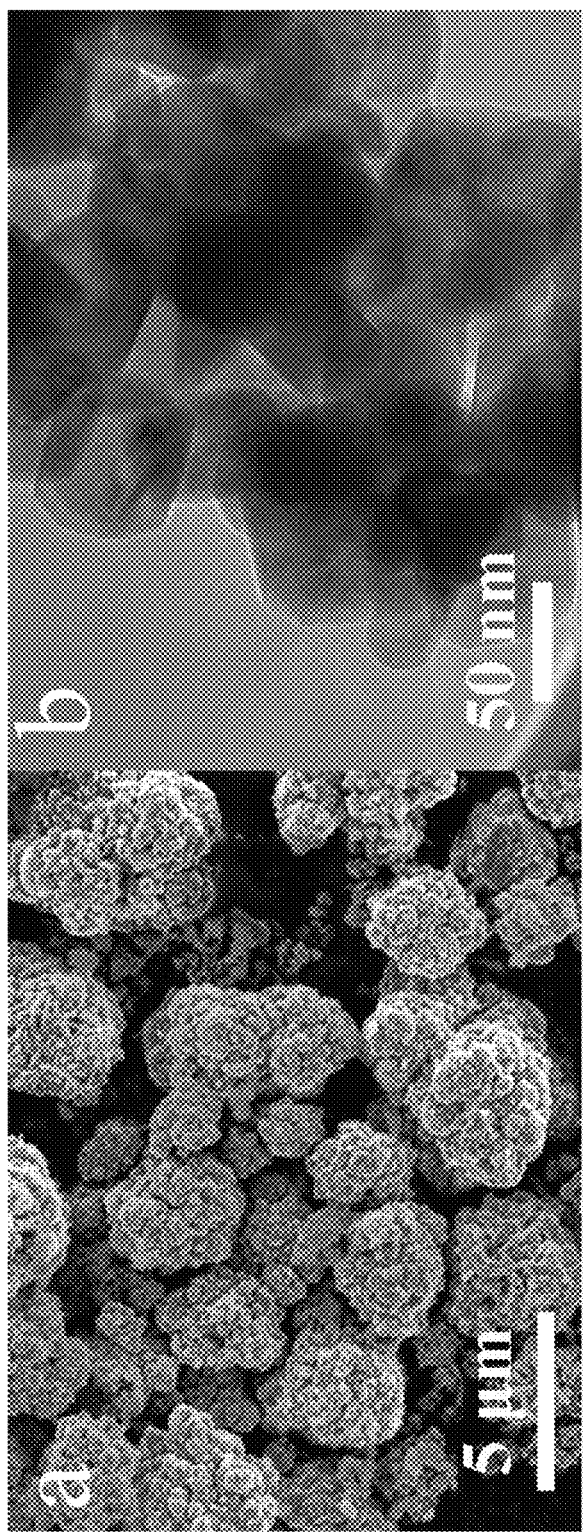
FIG. 14: Scanning electron microscopy (SEM) (a) and TEM (b) images of starting Co$_3$O$_4$.
Figure 15:
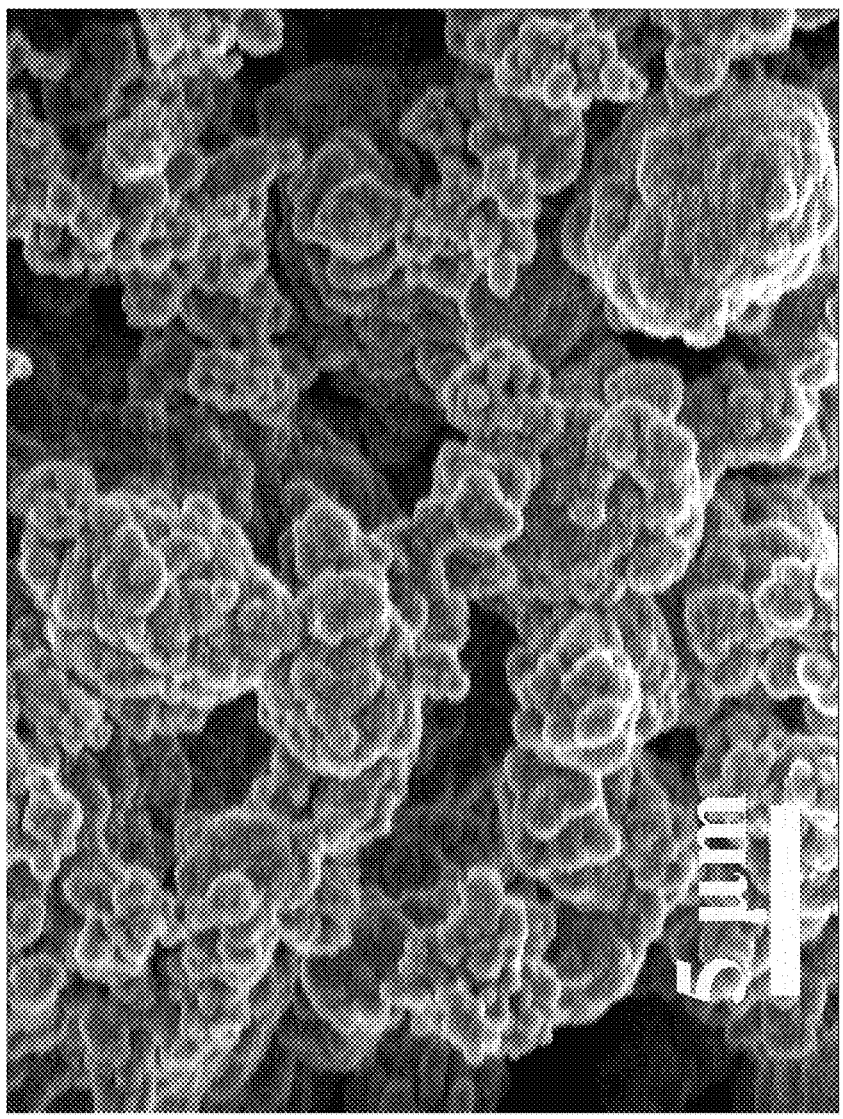
FIG. 15: SEM image of N—Co/N—Li$_2$O nanocomposite. The overall shape of the starting Co$_3$O$_4$ is preserved after the reaction. The starting Co$_3$O$_4$ composed of micrometer-sized (about 3-5 μm) secondary particle aggregates with initial particle size of about 50-100 nm. Compared with monodisperse nanoparticles, this secondary structure provides the starting material with a much higher tap density. A high tap density can also be obtained after the reaction for the N—Co/N—Li$_2$O product.
Figure 18:
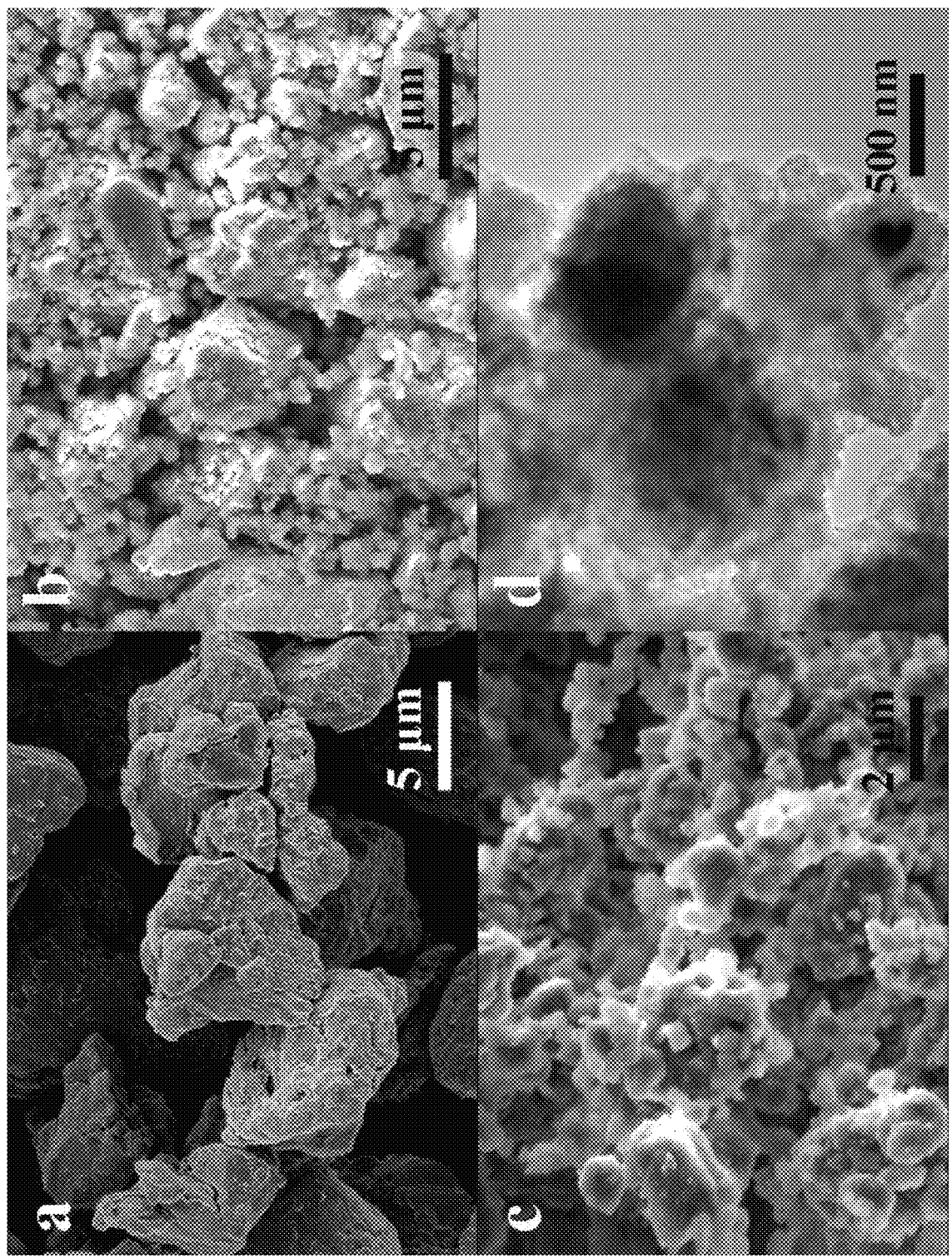
FIG. 18: Morphology and structure of M-Co/N—Li$_2$O and SM-Co/N—Li$_2$O composites. a,b, SEM image of micrometer-sized Co particles (a) and M-Co/N—Li$_2$O composite (b). c,d, SEM (c) and TEM (d) images of the SM-Co/N—Li$_2$O composite. After mechanical milling of the M-Co/N—Li$_2$O composite, the SM-Co/N—Li$_2$O composite is prepared. The starting micrometer-sized Co particles break into sub-micrometer-sized particles and the Li$_2$O nanoparticles are coated on the surface of Co particles with a close contact.

Next, the structure of the N—Co/N—Li$_2$O nanocomposite and its evolution upon the electrochemical Li-extraction process were investigated. X-ray photoelectron spectroscopy (XPS), electron energy loss spectroscopy (EELS) and X-ray diffraction (XRD) results indicate the crystalline nature of Co nanoparticles and amorphous structure of Li$_2$O in the product (FIGS. 11-13). The starting Co$_3$O$_4$ is composed of micrometer-sized secondary particle aggregates with initial primary particle size of about 50-100 nm (FIG. 14). After the chemical reaction with Li, the microstructure changes significantly, although its overall shape is preserved (FIG. 15). Transmission electron microscopy (TEM) results show that the starting particles are substantially completely converted into about 5 nm Co nanoparticles embedded in a $Li_2O$ matrix after the reaction (FIG. 16). To gain insight into the distribution of metallic Co nanoparticles and $Li_2O$ in the composite, scanning TEM (STEM) was carried out. As shown in FIG. 3a, the dark/light contrast in a STEM image is clearly observed. The gray area can be assigned to $Li_2O$. The light patches indicate the existence of numerous Co nanoparticles. It is worth noting that the metallic Co nanocrystals are substantially uniformly embedded in the $Li_2O$ matrix. The crystallinity of metallic Co is confirmed by high resolution TEM (HRTEM) (FIG. 3b-3c). Meanwhile, the substantially uniform distribution of $Li_2O$ and Co in the nanocomposite is again verified by the STEM/energy-dispersive X-ray spectroscopy (EDX) and STEM/EELS element mapping analysis (FIG. 17). It is believed that the small size of Co nanoparticles and their uniform distribution in $Li_2O$, as well as the intimate contact between Co and $Li_2O$, are important for the full electrochemical extraction of Li from the N—Co/N—$Li_2O$ composite. These Co nanoparticles have slightly larger particle size and higher crystallinity compared with that of metal nanoparticles produced by electrochemically driven conversion reaction (about 2 nm), which explains why the chemically synthesized N—Co/N—$Li_2O$ composite has a higher OCV and a higher charge potential than that obtained from the electrochemically driven conversion reaction. In contrast, with much bigger Co particles and looser contact between Co and $Li_2O$, the M-Co/N—$Li_2O$ composite and SM-Co/N—$Li_2O$ composites exhibit much higher charge potentials and deliver very low specific charge capacity in the same applied potential range (FIG. 2b and FIG. 18).

Figure 19:
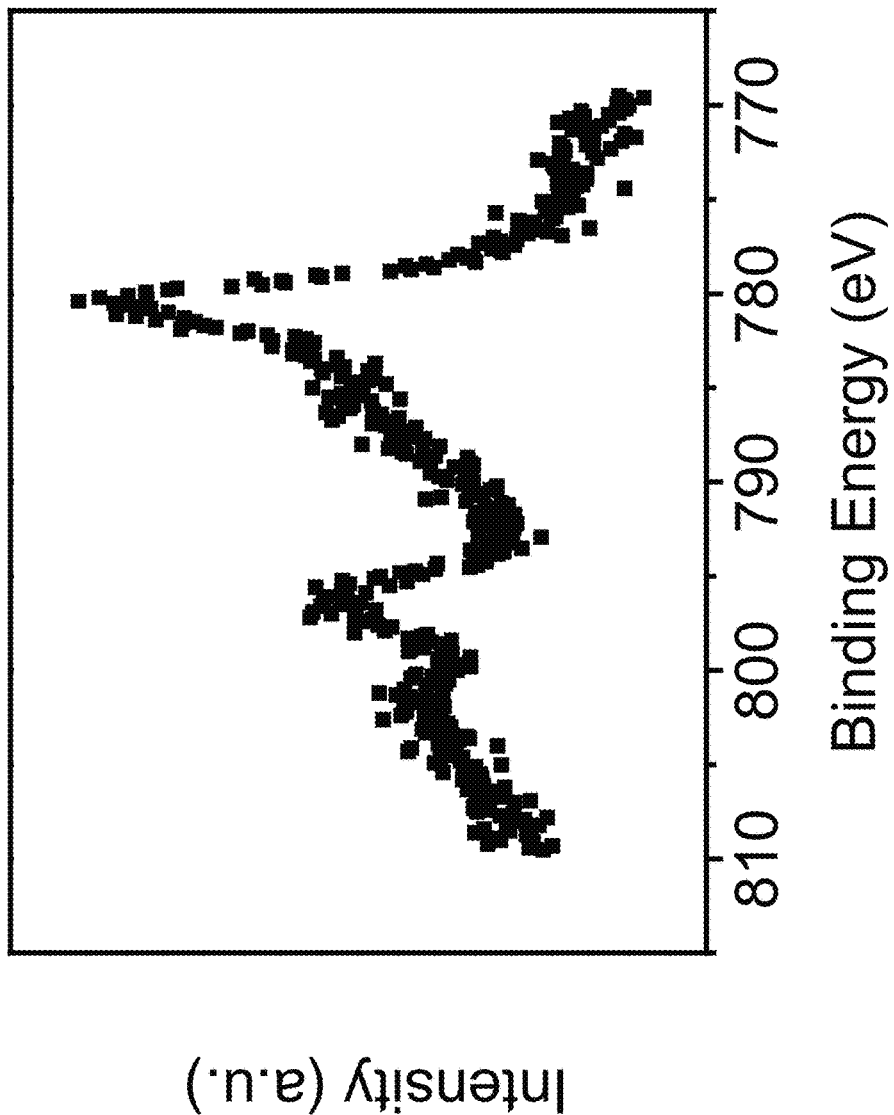
FIG. 19: High-resolution Co 2p XPS spectrum of N—Co/N—Li$_2$O composite electrode in the charge state. The high-resolution Co 2p spectrum shows that the dominant Co $2p_{3/2}$ peak is centered at about 781.2 eV and the $Co2p_{1/2}$ features are located at about 797.1 eV, indicating the cobalt oxidation state of $Co_3O_4$.

To understand the Li-extraction process from the N—Co/N—$Li_2O$ composite, in situ TEM electrochemical measurement was carried out. The set-up of an in situ TEM electrochemical device is based on previous studies. As shown in FIG. 3d-3e, the electrochemical micro-cell was composed of the N—Co/N—$Li_2O$ composite as the working electrode and a template-fabricated hollow carbon fiber as the counter electrode. The $Li_2O$ layer on the surface of the working electrode also acts as a solid electrolyte. A voltage bias is applied to drive the reverse conversion reaction and extract Li out of the working electrode towards the hollow carbon counter electrode. A series of TEM images for an N—Co/N—$Li_2O$ particle aggregate are recorded during the delithiation process (FIG. 3f). The results show that, substantially immediately after application of a voltage bias, the starting particles shrink continuously, indicating Li is being extracted. Taking into account the initial size of the N—Co/N—$Li_2O$ particle aggregate, less than about 1/2 of its initial volume is retained after the delithiation. Furthermore, that the Li transfers from the N—Co/N—$Li_2O$ working electrode to the carbon counter electrode is effectively confirmed by the EELS spectra taken on the carbon counter electrode before and after the delithiation process (FIG. 3g). The product of starting materials after delithiation is confirmed as $Co_3O_4$ by XPS, indicating its reverse conversion reaction mechanism: $3Co+4Li_2O \rightarrow Co_3O_4+8Li$ (FIG. 19).

Figure 4:
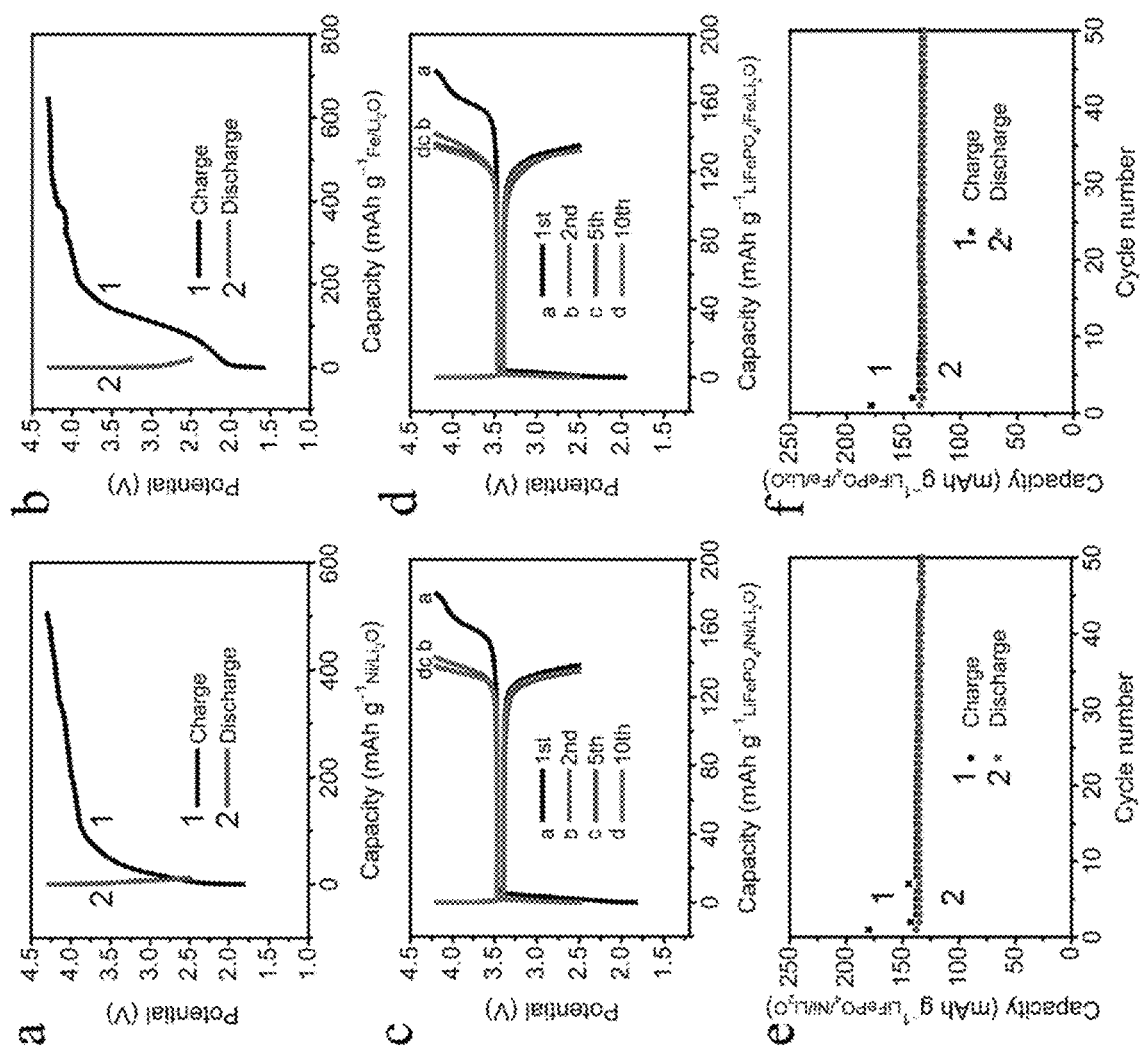
FIG. 4: Generalization to other N-M/N—Li$_2$O nanocomposites. a,b, The initial charge/discharge voltage profiles of pristine N—Ni/N—Li$_2$O (a) and N—Fe/N—Li$_2$O electrodes (b). c,d, The potential profiles of LiFePO$_4$ electrodes with about 4.8% (by weight) of N—Ni/N—Li$_2$O (c) and N—Fe/N—Li$_2$O (d) additives, respectively. e,f, Cycle performance of LiFePO$_4$ electrodes with the N—Ni/N—Li$_2$O (e) and N—Fe/N—Li$_2$O (f) additives, respectively. The specific capacities of the cathodes are evaluated based the weight of LiFePO$_4$ and the additives.
Figure 20:
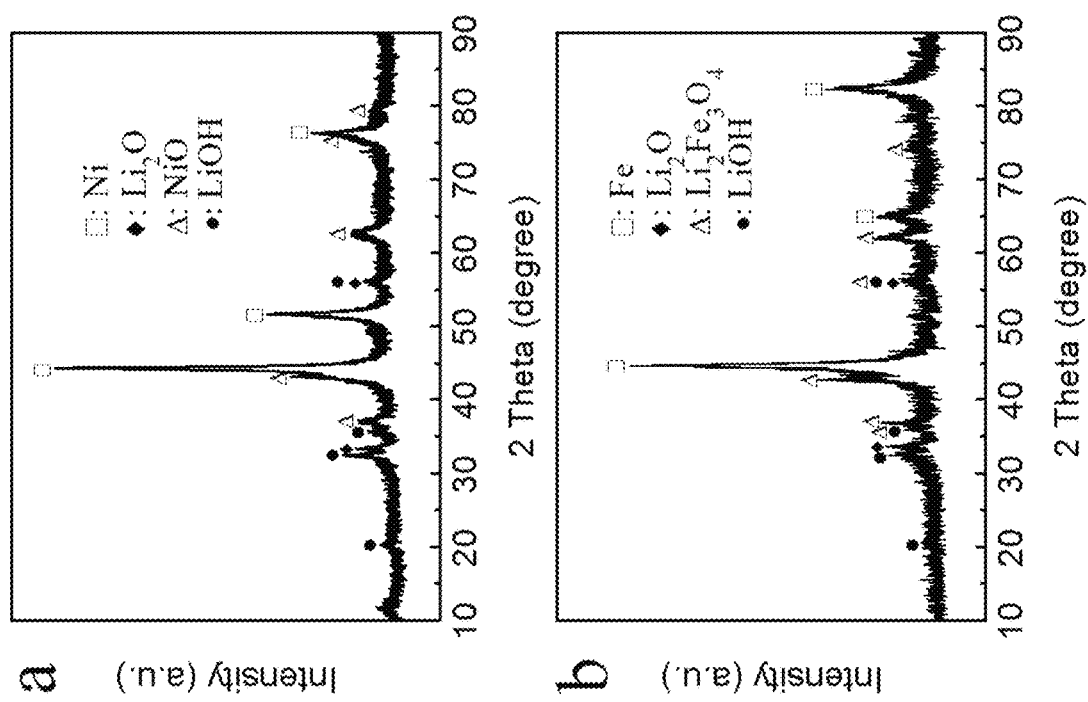
FIG. 20: XRD patterns of as-synthesized (a) $Ni/Li_2O$ and (b) $Fe/Li_2O$ nanocomposites. The XRD results indicate that after the reaction, most of the starting NiO and $Fe_3O_4$ are converted into metal (Ni and Fe) nanoparticles and $Li_2O$ (FIG. 20). A small amount of residual NiO exists in the $Ni/Li_2O$ composite (FIG. 20a). The intermediate $Li_2Fe_3O_4$ is observed in the $Fe/Li_2O$ product due to the uncompleted reaction between $Fe_3O_4$ and lithium (FIG. 20b). Very weak XRD peaks for LiOH appears due to the reaction between $Li_2O$ and $H_2O$ in air. The samples for XRD were exposed to the ambient condition for 5 weeks. Weak XRD peaks of LiOH appear.

To show the generality of using N-M/N—$Li_2O$ nanocomposites as high-capacity cathode additives, N—Ni/N—$Li_2O$ and N—Fe/N—$Li_2O$ composites were also prepared using the same synthesis procedure. The composition of M and $Li_2O$ is confirmed by XRD results (FIG. 20). Working electrodes were prepared for N—Ni/N—$Li_2O$ and N—Fe/N—$Li_2O$ nanocomposites, respectively. As shown in FIG. 4a-b, the N—Ni/N—$Li_2O$ and N—Fe/N—$Li_2O$ electrodes exhibit different potential profiles upon the first-cycle charge process, potentially due to the difference of M atoms and particle size. Similar to the N—Co/N—$Li_2O$ nanocomposite, the materials possess high initial OCV (higher than about 1.5 V) and deliver high charge capacities of about 506 and about 631 mAh $g^{-1}$, respectively, and very low discharge capacity of about 11 and about 19 mAh $g^{-1}$, respectively (FIG. 4a-b). $LiFePO_4$ electrodes with the two additives were both subject to cycling (FIG. 4c-d). The first-cycle charge capacities are improved significantly. The initial charge capacities are about 180 mAh $g^{-1}$ for the electrode with about 4.8% (by weight) of N—Ni/N—$Li_2O$ additive and about 178 mAh $g^{-1}$ for that with about 4.8% (by weight) of N—Fe/N—$Li_2O$ nanocomposites, respectively. These capacities are about 10% higher than that of $LiFePO_4$ electrodes without any prelithiation additive. Moreover, these electrodes also show excellent cycle stability (FIG. 4e-f).

In the above experiments, traditional slurry-coating manufacturing was used for preparation of the electrodes. The as-prepared N-M/N—$Li_2O$ (M: Co, Fe, Ni) nanocomposites are compatible with a widely used N-methyl pyrrolidinone (NMP) solvent and the most commonly used polyvinylidene fluoride (PVDF) binder in Li-ion batteries and the materials are stable in the battery-manufacturing ambient environment. Therefore, the materials are low-cost and high-capacity prelithiation reagents that are compatible with current industrial battery fabrication processes. Another advantage is that their synthesis is a readily-implemented one-step reaction. Owing to their superior performance as a Li donor, ready preparation and low cost, these conversion reaction-based cathode additives can have important applications in Li-ion batteries and can also be used in advanced battery systems involving high-capacity anodes (e.g., Si and Sn) with a large first-cycle capacity loss.

Materials Synthesis. To synthesize the N—Co/N—$Li_2O$ composite, $Co_3O_4$ nanoparticles (about 2 mmol, about 99.5%, Sigma-Aldrich) were reacted with molten lithium metal (about 16 mmol, about 99.9%, Alfa Aesar) at about 185° C. for about 20 minutes and about 200° C. for another about 20 minutes under continuous mechanical stirring in an Argon-filled glove box with moisture level below about 0.1 ppm and oxygen level below about 3.0 ppm. N—Ni/N—$Li_2O$ and N—Fe/N—$Li_2O$ composites were prepared with the same procedure using NiO (about 8 mmol, about 99.8%, Sigma-Aldrich) and $Fe_3O_4$ (about 2 mmol, about 97%, Sigma-Aldrich) nanoparticles as the starting materials. The molar ratios of MOs and lithium were designed according to their reaction ($M_xO_y$+$2y$Li→$x$M+$y$$Li_2O$). $Li_2O$ nanoparticles and micrometer-sized cobalt particles were obtained via treating commercial $Li_2O$ particles (about 97%, Sigma-Aldrich) and Co particles (about 99.8%, Sigma-Aldrich) with mechanical milling technique, separately. The as-obtained $Li_2O$ nanoparticles and micrometer-sized Co particles were mixed uniformly according to a molar ratio of about 4/3 to achieve the M-Co/N—$Li_2O$ composite. After further mechanical milling of the M-Co/N—$Li_2O$ composite, the SM-Co/N—$Li_2O$ composite was prepared.

Characterization. The XRD measurements were performed using a panalytical X'pert diffractometer with Ni-filtered Cu Kα radiation (λ=1.5406 Å). XPS analyses were conducted with a PHI Versa Probe 5000 system (Physical Electronics, MN). An FEI Titan 80-300 environmental TEM was employed for HRTEM and STEM images, EDS and EELS mapping collection, and in situ TEM measurements. Nanofactory Instruments Dual-Probe STM-TEM in situ sample holder was employed to demonstrate the delithiation process for the N—Co/N—Li$_2$O nanocomposite. During the measurement, a relative bias of about 6 V was applied between the N—Co/N—Li$_2$O working electrode and hollow carbon fiber counter electrode, which caused the inverse conversion reaction to extract Li from the working electrode and its transfer to the counter electrode. EELS spectra were taken on the carbon electrode before and after the delithiation of the N—Co/N—Li$_2$O nanocomposite.

Electrochemical measurements. The battery performances were carried out using a 2032-type coin cell (MTI Corporation) on an Arbin Battery Cycler instrument. The cells were assembled in an Argon-filled glove box using about 1 M LiPF$_6$ in a mixture of ethylene carbonate (EC) and diethyl carbonate (DEC) (about 1:1 v/v) as the electrolyte and a Celgard 2300 membrane as the separator. All of the electrodes were constructed in ambient condition using a slurry method by mixing the active materials, carbon black and PVDF binder in NMP solvent. The M/Li$_2$O electrodes were composed of about 60% M/Li$_2$O nanocomposite, about 30% carbon black and about 10% PVDF binder in weight with a typical loading of about 1 mg/cm$^2$. Commercial LiFePO$_4$ powder (MTI Corporation) and the as-synthesized cathode additives were mixed at different weight ratios as the active hybrid cathode materials. LiFePO$_4$ electrodes were prepared with about 80% (by weight) of these hybrid cathode materials, about 10% (by weight) of carbon black and about 10% (by weight) of PVDF. Their typical mass loading is about 5 mg/cm$^2$. Graphite electrodes were made by mixing graphite powder (MTI Corporation), carbon black and PVDF with a mass ratio of about 8:1:1. M/Li$_2$O/Li metal half cells were charged to about 4.1/4.3 V and discharged to about 2.5 V at a current density of about 50 mA/g. The galvanostatic charge/discharge measurement for LiFePO$_4$/Li half cells was carried out with the cut-off potential range of about 2.5-4.2 V. The cut-off potential range for LiFePO$_4$/graphite full cells is about 1.5-4.2 V. The current density for LiFePO$_4$ electrodes is about 0.1 C for the first cycle and about 0.2 C upon the following cycles.

Li$_2$S/Metal and LiF/Metal Nanocomposites

Li$_2$S/Co nanocomposite was synthesized through the chemical reaction between molten lithium and CoS$_2$ powder in an inert atmosphere. Molten lithium and CoS$_2$ powder were mixed together under mechanical stirring at about 185° C. with a molar ratio of about 4:1 according to the conversion reaction equation (CoS$_2$+4Li→Co+2Li$_2$S). A black product was obtained after the reaction at about 185° C. for about 20 minutes and about 200° C. for about 2 hours.

Figure 21:
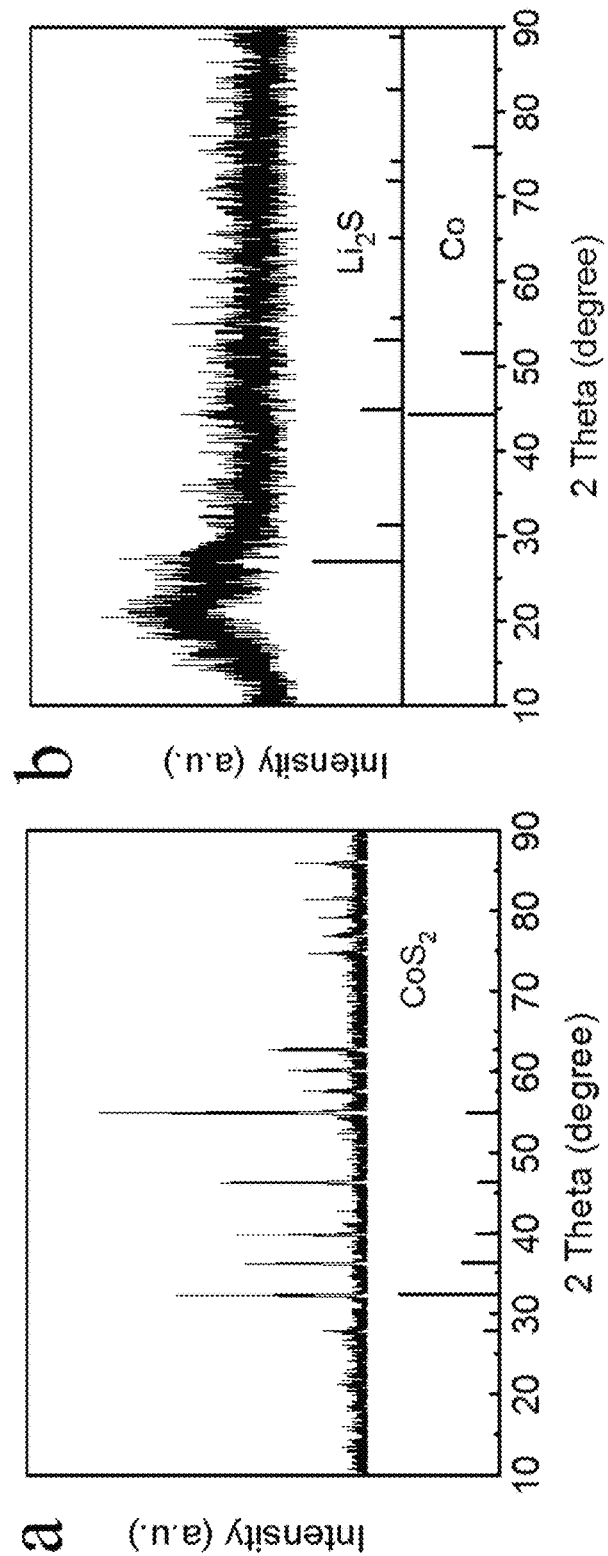
FIG. 21: XRD patterns of starting $CoS_2$ (a) and the product (b) after the reaction with molten lithium. The XRD peaks at about 21° and about 27° arise from a Kapton tape, which is used to protect $Li_2S$ from moisture in the air.
Figure 22:
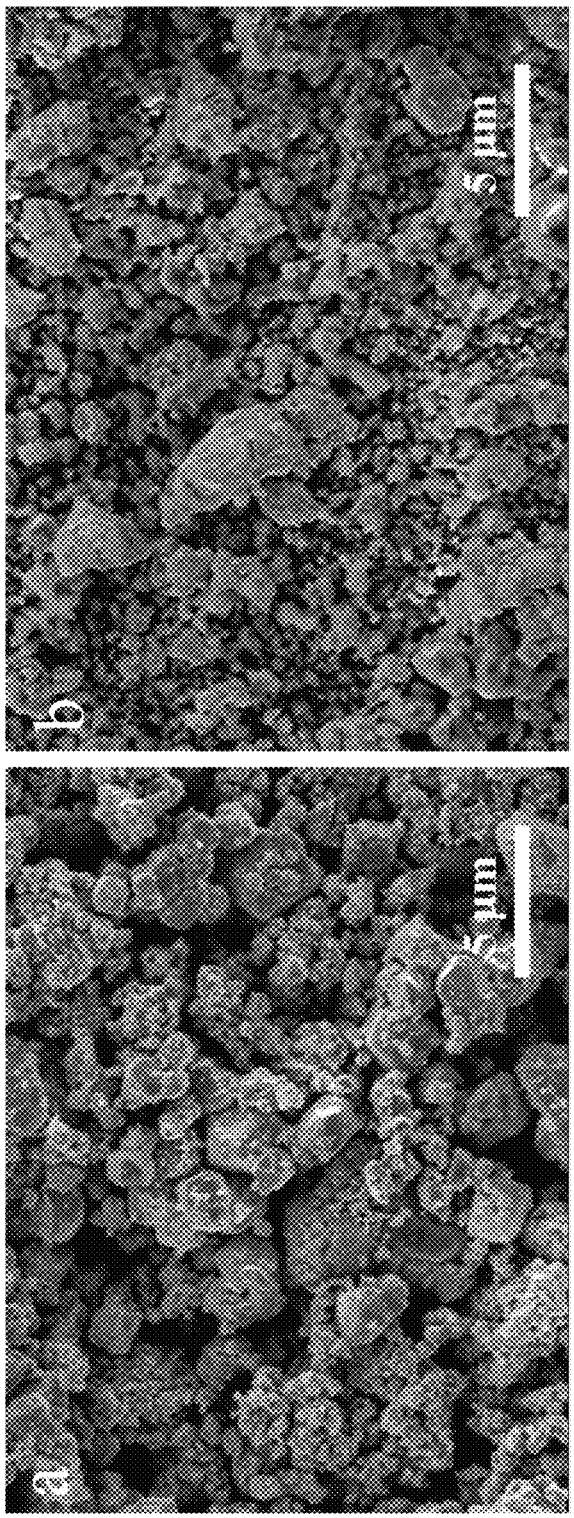
FIG. 22: SEM images of starting $CoS_2$ (a) and the product (b) after the reaction with molten lithium.

XRD patterns for the starting CoS$_2$ and Co/Li$_2$S product are shown in FIG. 21. The starting CoS$_2$ exhibits sharp diffraction peaks with strong intensities, indicating its large particle size and high crystallinity (FIG. 21a). After the reaction, the XRD peaks for CoS$_2$ (JCPDS no. 41-1471) disappear and new broad diffraction peaks with weak intensities are observed, indicating the chemical reaction-induced phase change (FIG. 21b). These peaks can be readily indexed to mixed phases of Co (JCPDS no. 15-0806) and Li$_2$S (JCPDS no. 23-0369), in agreement with the product of the conversion reaction. No characteristic peaks are observed for the intermediate products and the residual CoS$_2$, indicating substantially complete phase conversion. The significant broadening and reduced intensity of the XRD peaks confirm the nanocrystalline nature of the Li$_2$S/Co product. SEM images show that the overall morphology of the starting CoS$_2$ is preserved after the reaction (FIG. 22).

Figure 23:
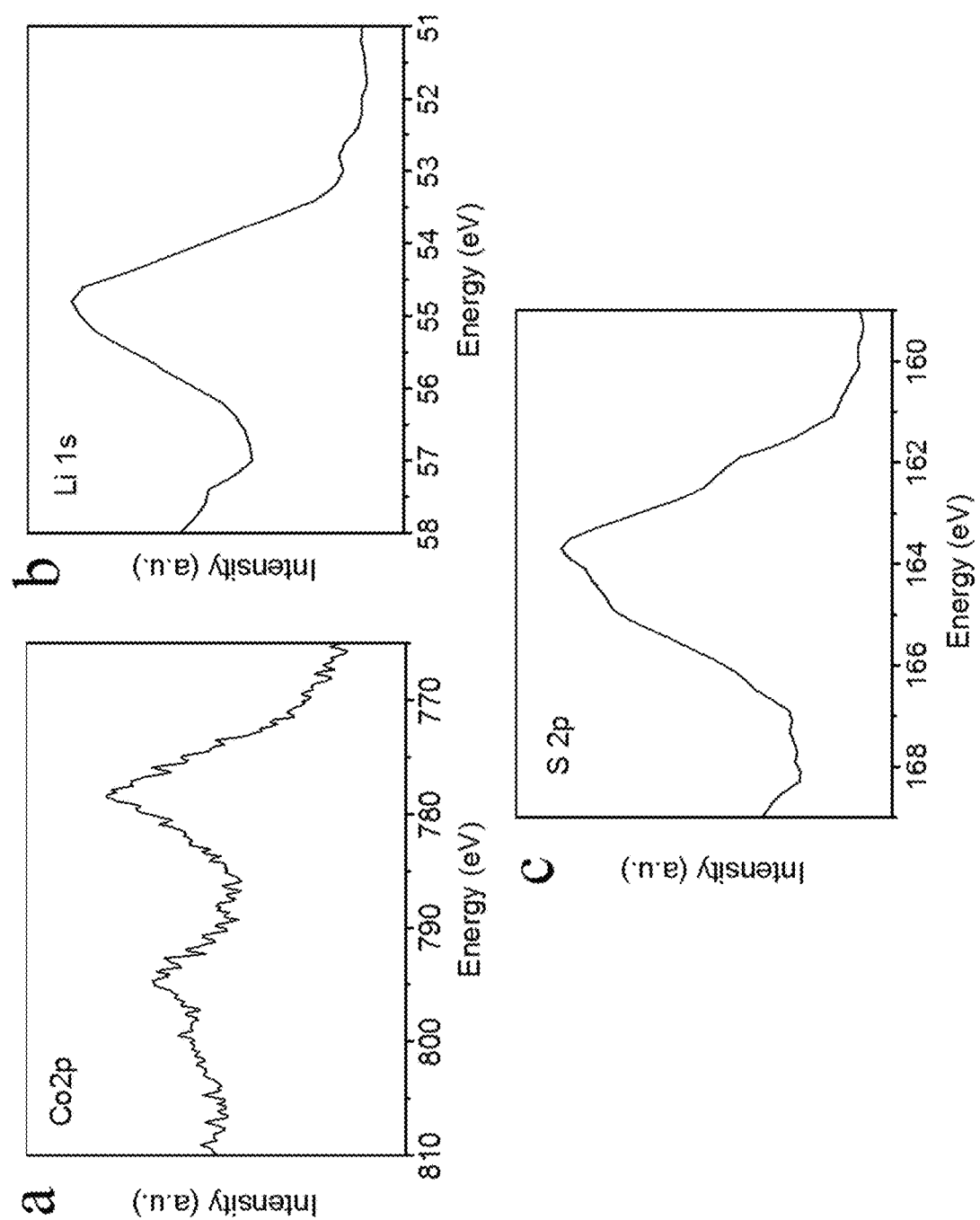
FIG. 23: High-resolution XPS spectra of (a) Co 2p, (b) Li 1s and (c) S 2p for a $Li_2S/Co$ nanocomposite.

XPS investigations for the product were carried out to examine the surface electronic state. High-resolution Co 2p spectrum exhibits two peaks at about 793.7 and about 778.5 eV, corresponding to the Co 2p$_{1/2}$ and Co 2p$_{3/2}$ spin-orbit peaks of Co (FIG. 23a). It is observed that the Li is XPS spectrum can be fitted with a single peak with a binding energy of about 54.8 eV (FIG. 23b), which can be assigned to Li in the Li—S bond. The chemical state of sulfur was also confirmed by high-resolution S 2p XPS spectrum (FIG. 23c).

Figure 24:
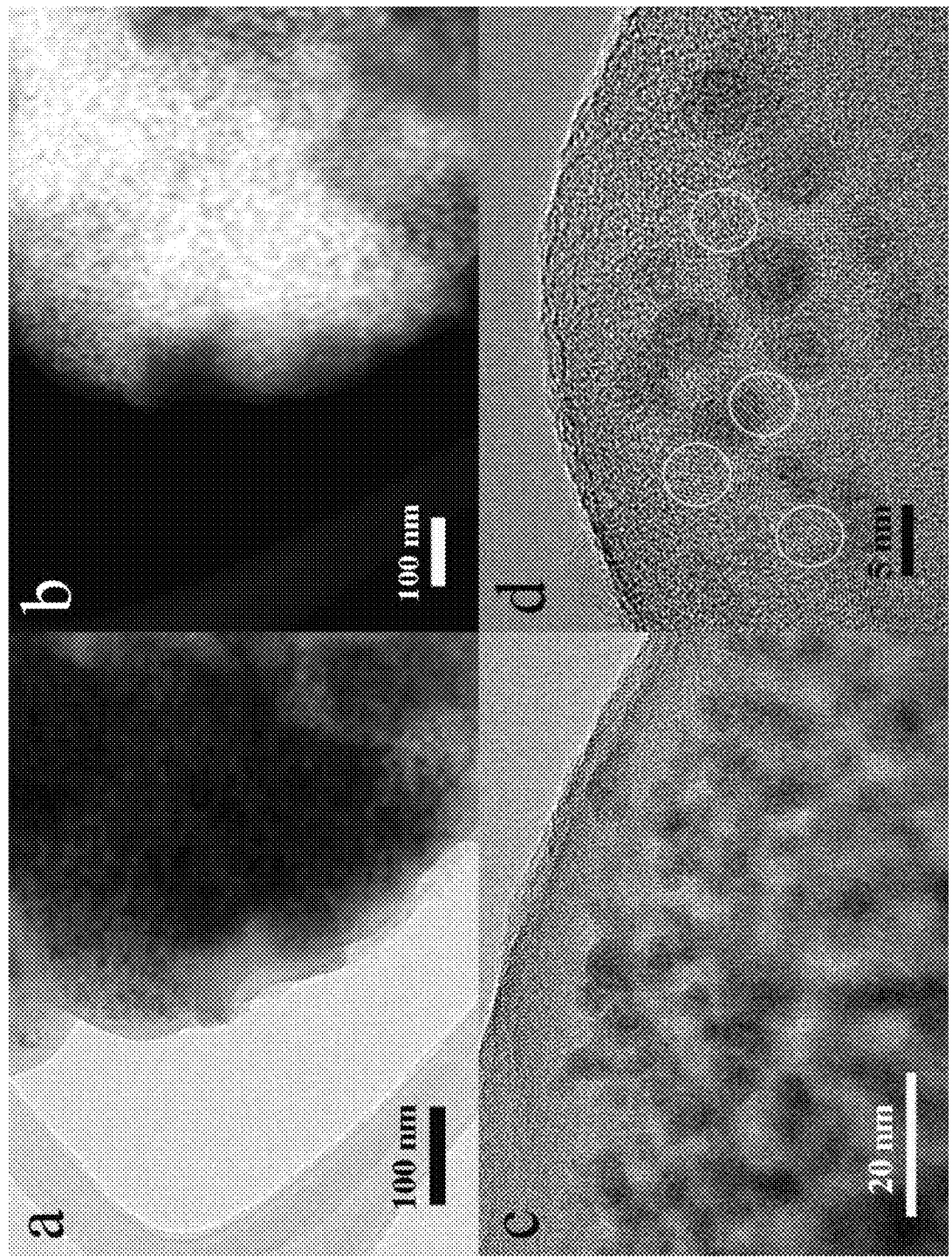
FIG. 24: (a) Low-magnification TEM, (b) STEM, (c) high-magnification TEM (HTEM) and (d) HRTEM images of a $Li_2S/Co$ composite.

The TEM image (FIG. 24a) and the corresponding STEM image (FIG. 24b) show that the product has a pitaya-like nanostructure, where Co nanoparticles are substantially uniformly embedded in a Li$_2$S matrix. High-magnification (HTEM) and HRTEM images show that the size of crystallized Co nanoparticles is about 5 nm (FIGS. 24c and 24d). The Li$_2$S matrix possesses a dense structure without pores observed under TEM. It has a nanocrystalline nature and an ultrafine crystallite size (about 5 nm).

Figure 25:
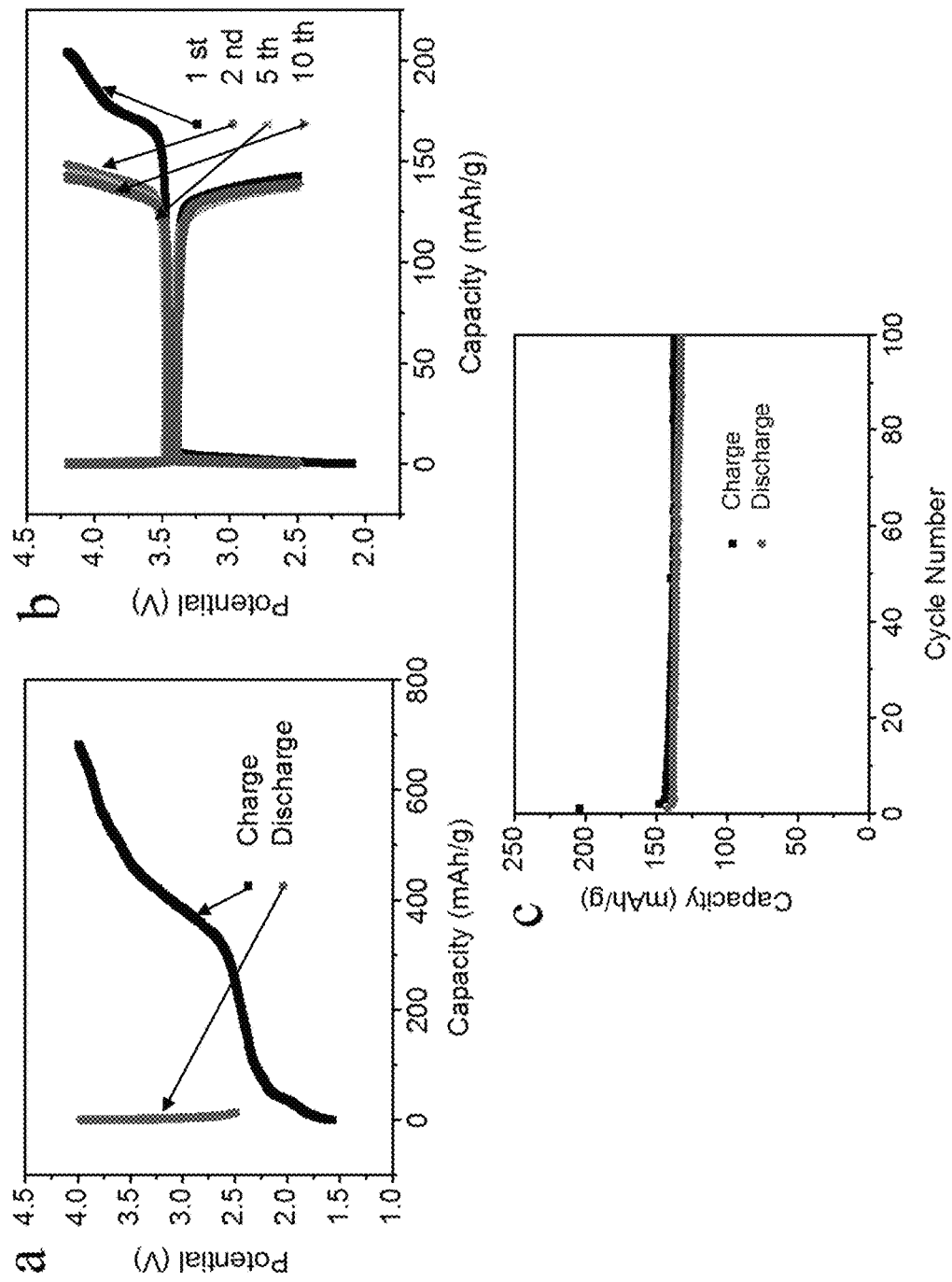
FIG. 25: (a) The initial charge and discharge curves for $Li_2S/Co$ electrode within the voltage range of about 4.0-2.5 V vs. $Li^+/Li$ at the current density of about 50 mA $g^{-1}$, (b) the charge and discharge curves and (c) cycling stability for $LiFePO_4$ electrode with about 4.8% (by weight) of $Li_2S/Co$ additive within the voltage range of about 4.2-2.5 V vs. $Li^+/Li$.

The electrochemical performances of the Li$_2$S/Co nanocomposite were investigated. The first-cycle galvanostatic discharge/charge profiles of a Li$_2$S/Co electrode is shown in FIG. 25a. The Li$_2$S/Co electrode has an OCV of about 1.5 V. It can be observed that its initial specific charge capacity reaches about 683 mAh g$^{-1}$, while the specific discharge capacity is about 13 mAh g$^{-1}$ within the cut-off potential range of about 4.0-2.5 V vs. Li$^+$/Li at the current density of about 50 mA g$^{-1}$. The content of Li$_2$S in the Li$_2$S/Co nanocomposite is about 60.9 wt. %. The theoretical specific capacity of the composite is about 711 mAh g$^{-1}$ (the theoretical specific capacity of the pristine Li$_2$S is about 1166 mAh g$^{-1}$). Thus, when used as a cathode prelithiation additive, almost the full amount of Li in the nanocomposite can be extracted during the cathode charge process, since the cut-off charge potential for commercial cathode is typically above about 4.0 V (e.g., about 4.2 V for LiFePO$_4$, about 4.3 V for LiCoO$_2$ and about 4.3 V for LiMn$_2$O$_4$). In the discharge process, due to the discharge potential limit (>about 2.5 V), the nanocomposite additive does not intake lithium ion at the minimum potential for cathode discharge. The high OCV, high initial specific charge capacity and large hysteresis render the as-prepared Li$_2$S/Co nanocomposite desirable as cathode prelithiation additives. To further investigate its electrochemical compatibility with cathode materials and lithium compensation effect, the Li$_2$S/Co nanocomposite was used as a prelithiation reagent for a commercial LiFePO$_4$ cathode and their electrochemical performances in half cells (using lithium metal as the counter electrode and reference electrode) were evaluated. It can be seen that the LiFePO$_4$ electrode with about 4.8% (by weight) of Li$_2$S/Co additive delivers an initial charge specific capacity of about 204 mAh g$^{-1}$ at about 0.1 C (evaluated based on the weight of LiFePO$_4$), about 34 mAh g$^{-1}$ higher than the theoretical specific capacity of LiFePO$_4$, as well as stable cycling (FIGS. 25b and 25c).

Figure 26:
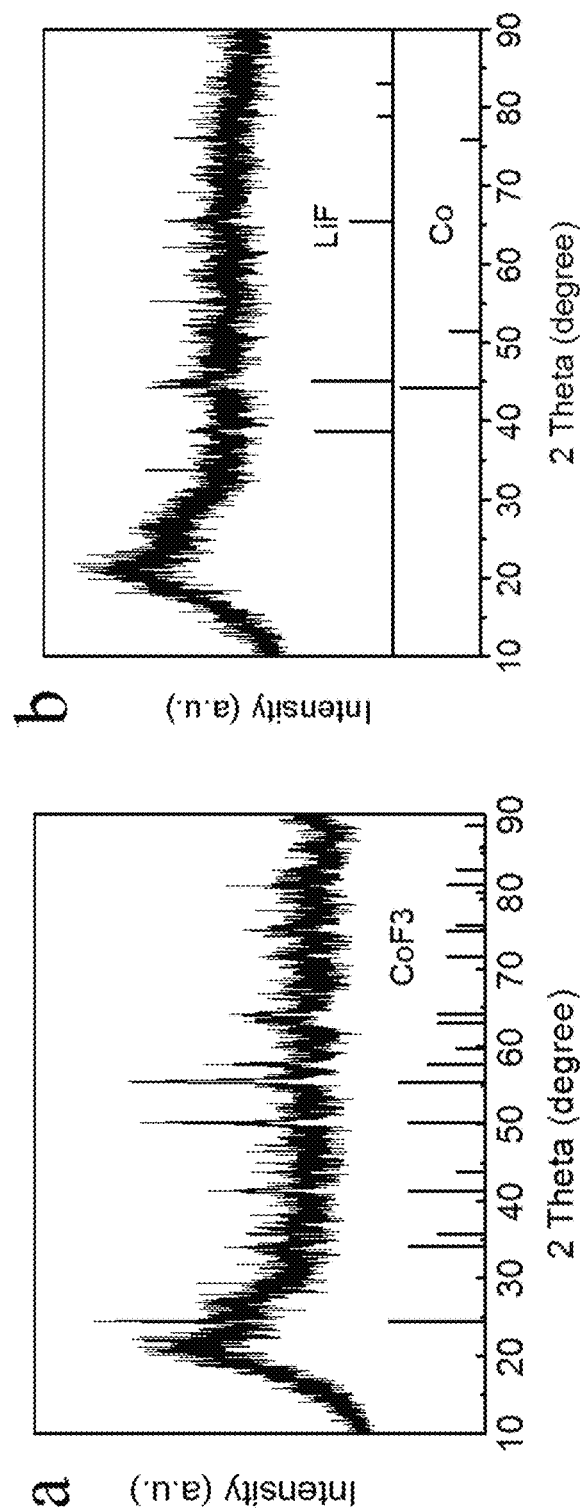
FIG. 26: XRD patterns of starting $CoF_3$ (a) and the product (b) after the reaction with molten lithium. The XRD peaks at about 21° and about 27° arise from a Kapton tape, which is used to protect LiF from moisture in the air.
Figure 27:
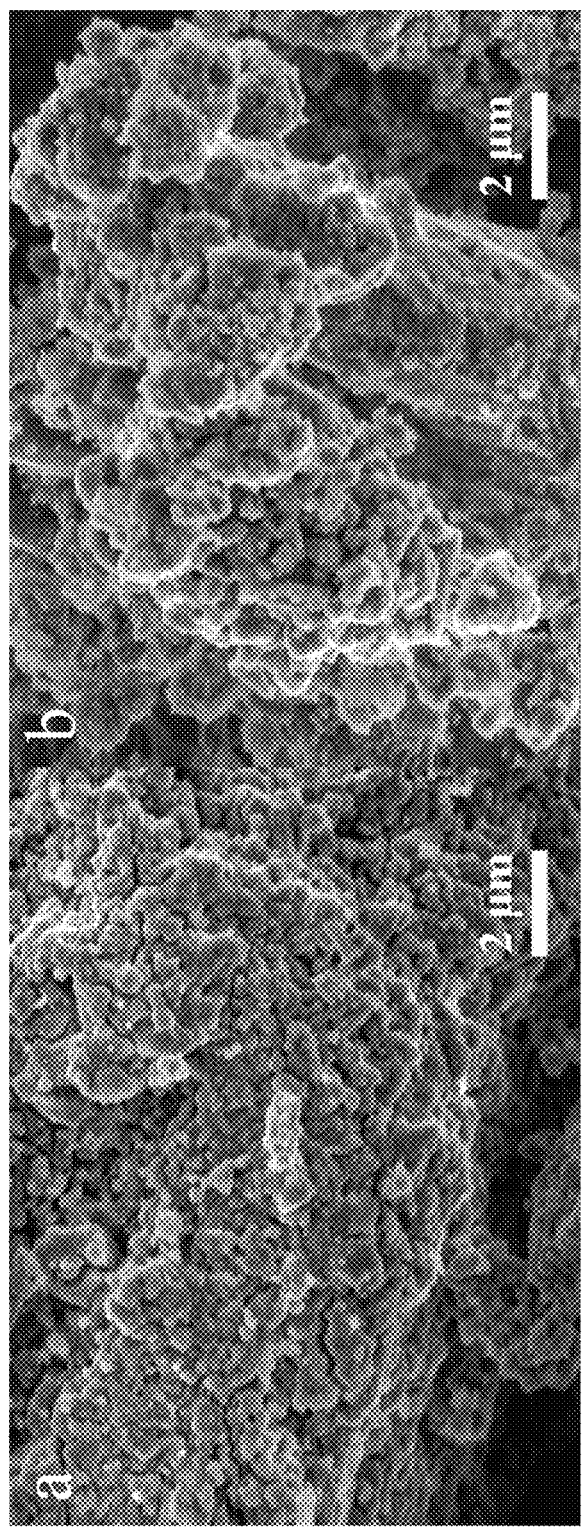
FIG. 27: SEM images of starting $CoF_3$ (a) and the product (b) after the reaction with molten lithium.

LiF/Co nanocomposite was also synthesized with a similar procedure using cobalt fluoride (CoF$_3$) and molten lithium as the starting materials. The reaction equation is as follows: CoF$_3$+3Li→Co+3LiF. After reaction, the brown powder turns black. XRD results show that the initial diffraction peaks for CoF$_3$ (JCPDS no. 09-0033) disappear, and new diffraction peaks for Co (JCPDS no. 15-0806) and LiF (JCPDS no. 04-0857) are observed (FIG. 26). SEM investigation shows that there is no overall morphology difference between the starting $CoF_3$ and the resulting LiF/Co nanocomposite (FIG. 27).

Figure 28:
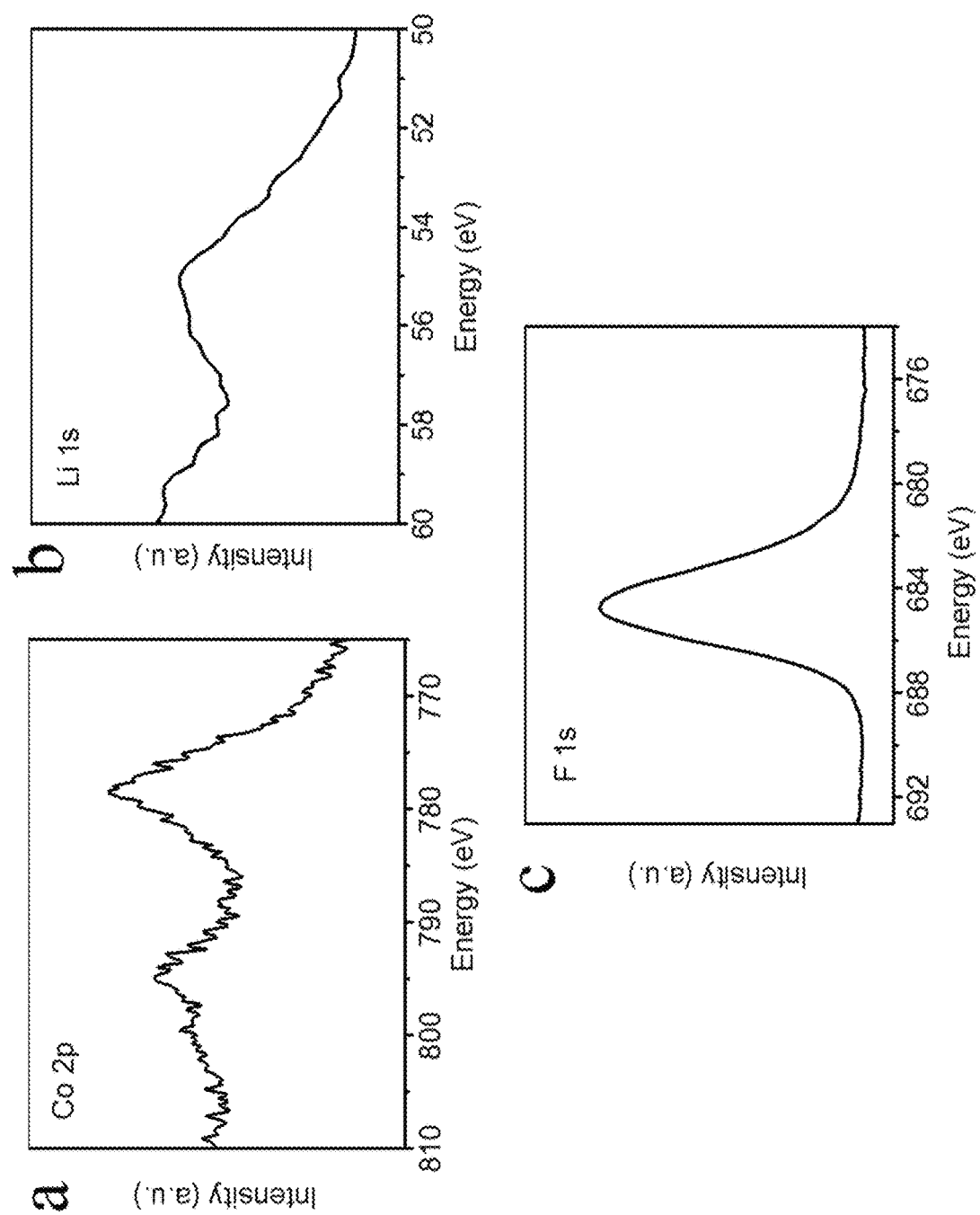
FIG. 28: High-resolution XPS spectra of (a) Co 2p, (b) Li 1s and (c) F 1s for a LiF/Co nanocomposite.
Figure 29:
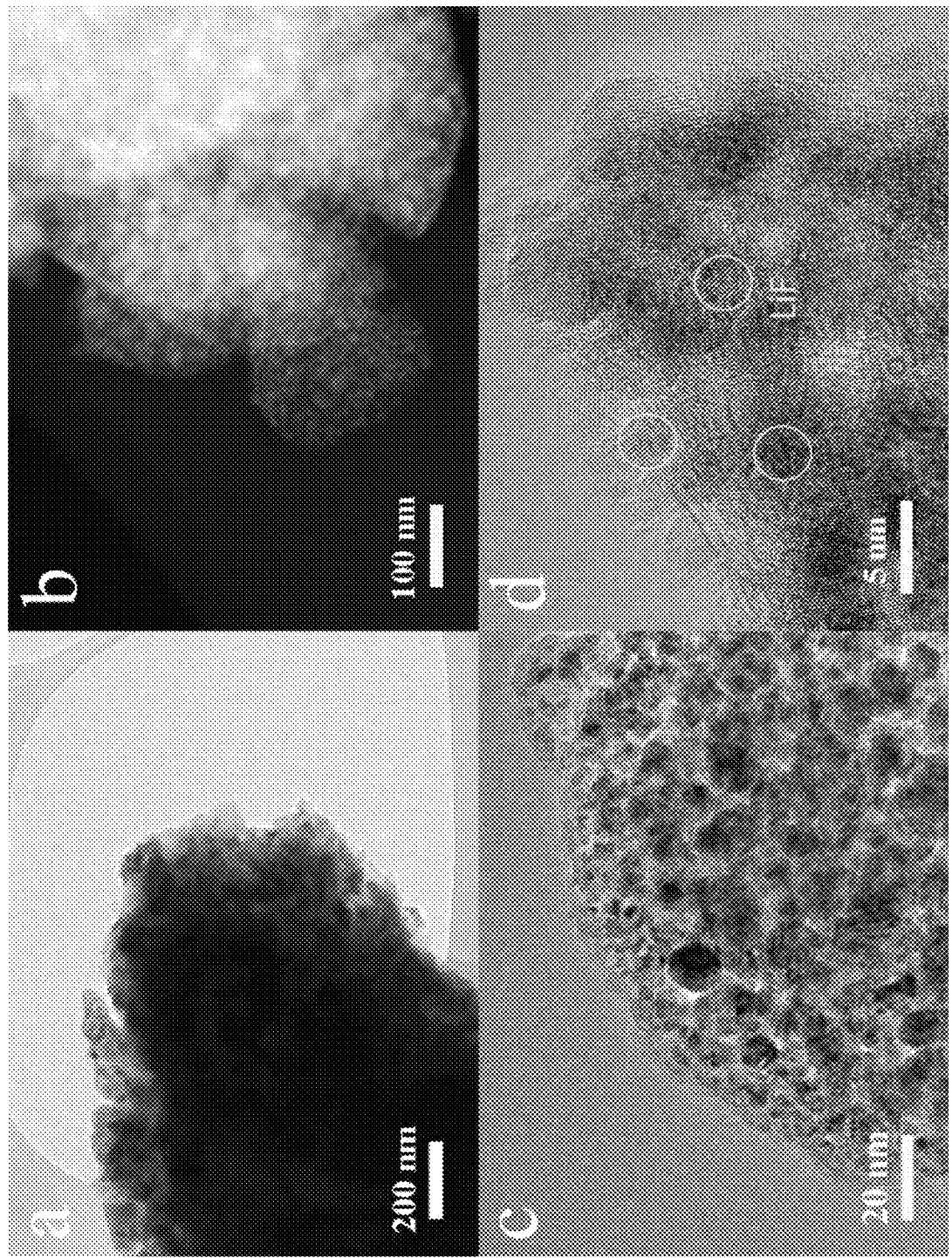
FIG. 29: (a) Low-magnification TEM, (b) STEM, (c) HTEM and (d) HRTEM images of a LiF/Co nanocomposite.

Further evidence of the LiF/Co nanocomposite can be found by XPS investigation. The high-resolution Co 2p XPS spectrum indicates the presence of Co with Co $2p_{1/2}$ at about 793.7 eV and Co $2p_{3/2}$ at about 778.4 eV (FIG. 28a). The Li 1s peak is centered at about 55.6 eV (FIG. 28b), whereas the F 1s peak is found at about 684.8 eV (FIG. 28c), indicating the existence of LiF. TEM, STEM and HRTEM images (FIG. 29) show that the LiF/Co nanocomposite has a similar structure as the $Li_2S$/Co nanocomposite: Co nanoparticles with particle size of about 5-10 nm are substantially uniformly embedded in a polycrystalline LiF matrix with a particle size of about 5 nm.

Figure 30:
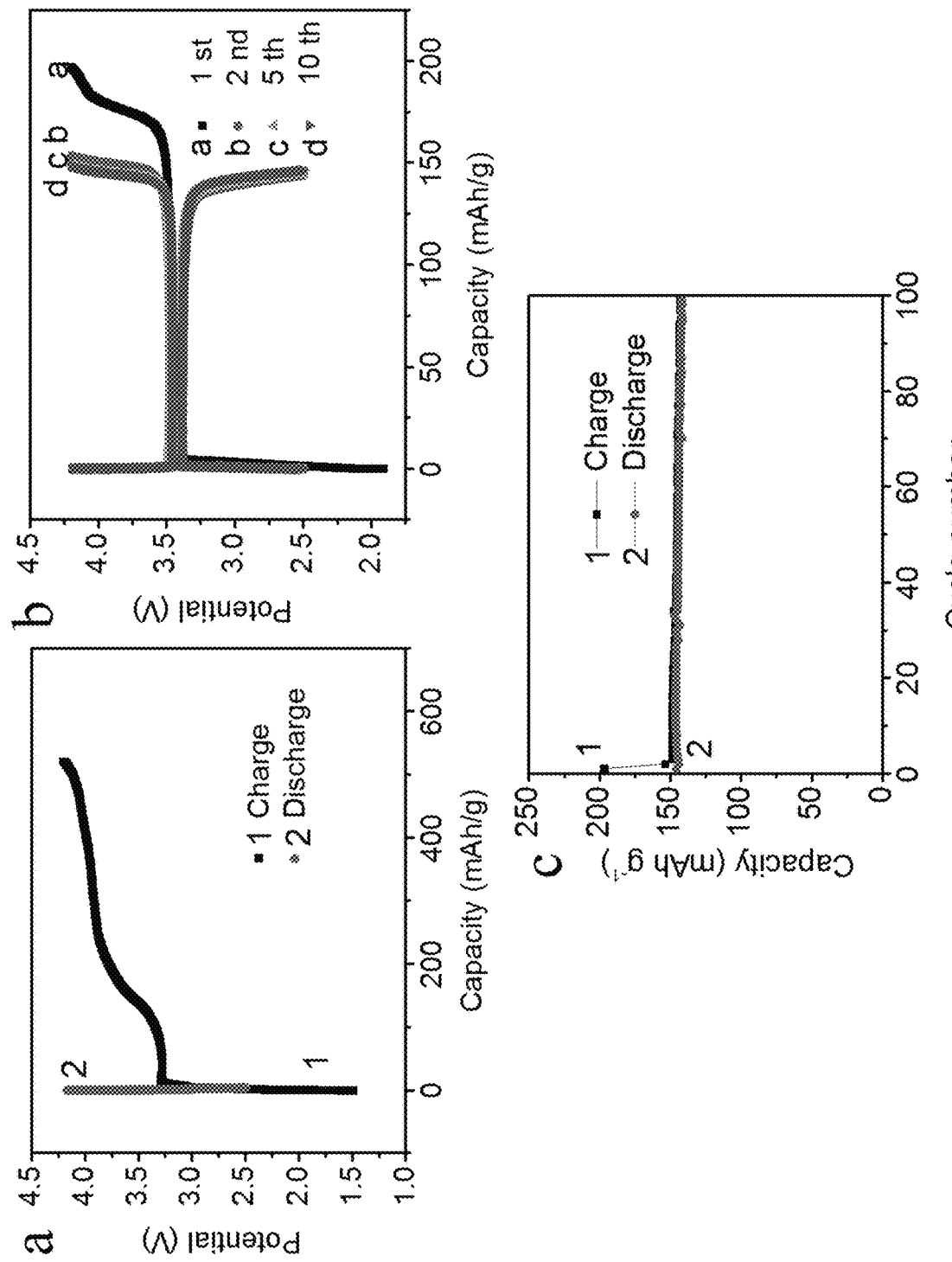
FIG. 30: (a) The initial charge and discharge curves for LiF/Co electrode within the voltage range of about 4.2-2.5 V vs. $Li^+/Li$ at the current density of about 50 mA $g^{-1}$, (b) the charge and discharge curves and (c) cycling stability for $LiFePO_4$ electrode with about 4.8% (by weight) of LiF/Co additive within the voltage range of about 4.2-2.5 V vs. $Li^+/Li$.

To investigate the first cycle charge capacity of the as-prepared LiF/Co nanocomposite, galvanostatic discharge/charge measurement of the pristine LiF/Co electrode was carried out within the voltage range of about 4.2-2.5 V vs. $Li^+$/Li at the current density of about 50 mA $g^{-1}$ (FIG. 30(a)). A high OCV is observed (about 1.5 V). The Li in the composite is extracted between about 3.2-4.2 V during the charge process. The specific charge capacity is about 520 mAh $g^{-1}$. In comparison to the high charge capacity, the specific discharge capacity is about 4 mAh $g^{-1}$. These electrochemical characterizations meet the guidelines for a prelithiation additive: high OCV, high initial charge capacity and negligible discharge capacity during the cut-off potential range of a cathode. The electrochemical compatibility with cathode materials and the lithium compensation effect were investigated by cycling $LiFePO_4$/lithium metal half cells with a small amount of LiF/Co cathode additive. The $LiFePO_4$ with about 4.8% (by weight) of LiF/Co additive delivers a high initial charge specific capacity of about 197 mAh $g^{-1}$ at about 0.1 C (evaluated based on the weight of $LiFePO_4$) and shows stable cycling (FIGS. 30(b) and (c))

Materials Synthesis. The preparation of the $Li_2S$/Co and LiF/Co nanocomposites was carried out in an Argon-filled glove box with moisture level below about 0.1 ppm and oxygen level below about 3.0 ppm. To synthesize the $Li_2S$/Co nanocomposite, lithium metal foil (about 16 mmol, about 99.9%, Alfa Aesar) was first melted at about 185° C., followed by the addition of $CoS_2$ powder (about 4 mmol, about 99.98%, Sigma-Aldrich). After the mixture was mechanically stirred for about 20 minutes at about 185° C. and about 2 hours at about 200° C., a black $Li_2S$/Co product was obtained. The LiF/Co nanocomposite was synthesized with a similar procedure using $CoF_3$ powder (about 4 mmol, Sigma-Aldrich) and lithium metal foil (about 12 mmol) as the starting materials.

Characterization. Power XRD patterns were recorded on a panalytical X'pert diffractometer with Ni-filtered Cu Kα radiation (λ=1.5406 Å). SEM characterizations were performed using an FEI XL30 Sirion SEM. TEM, HRTEM and STEM images, and EDS and EELS mapping collection were conducted on an FEI Titan 80-300 environmental TEM. A PHI Versa Probe 5000 system (Physical Electronics, MN) was used for XPS analyses.

Electrochemical measurements. The $Li_2S$/Co and LiF/Co working electrodes were prepared by mixing about 70% active materials, about 20% carbon black and about 10% PVDF binder in NMP solvent, casting the slurry on an Al foil and drying at about 80° C. in vacuum. Their typical mass loading is about 1 mg/$cm^2$. The same slurry method was also used to construct $LiFePO_4$ electrodes with cathode prelithiation materials. The as-prepared cathodes composed of about 75.2% commercial $LiFePO_4$ powder (MTI Corporation), about 4.8% prelithiation reagents ($Li_2S$/Co or LiF/Co nanocomposite), about 10% carbon black and about 10% PVDF with a typical mass loading of about 4.5 mg/$cm^2$. 2032-type coin cells (MTI Corporation) were assembled in an Argon-filled glove box. A lithium metal foil served as both the counter and reference electrodes. The electrolyte was about 1 M $LiPF_6$ in about 1:1 v/v EC and DEC. A Celgard 2300 membrane was used as the separator. The electrochemical performances were evaluated on an Arbin Battery Cycler instrument. The galvanostatic charge/discharge measurements for cells with $Li_2S$/Co and LiF/Co cathodes and lithium metal anodes were performed at a current density of about 50 mA $g^{-1}$ in the cut-off potential range of about 4.0-2.5 V and about 4.2-2.5 V, respectively. The $LiFePO_4$/Li half cells were cycled in the cut-off potential range of about 2.5-4.2 V at about 0.1 C for the first cycle and about 0.2 C upon the following cycles.

Figure 31:
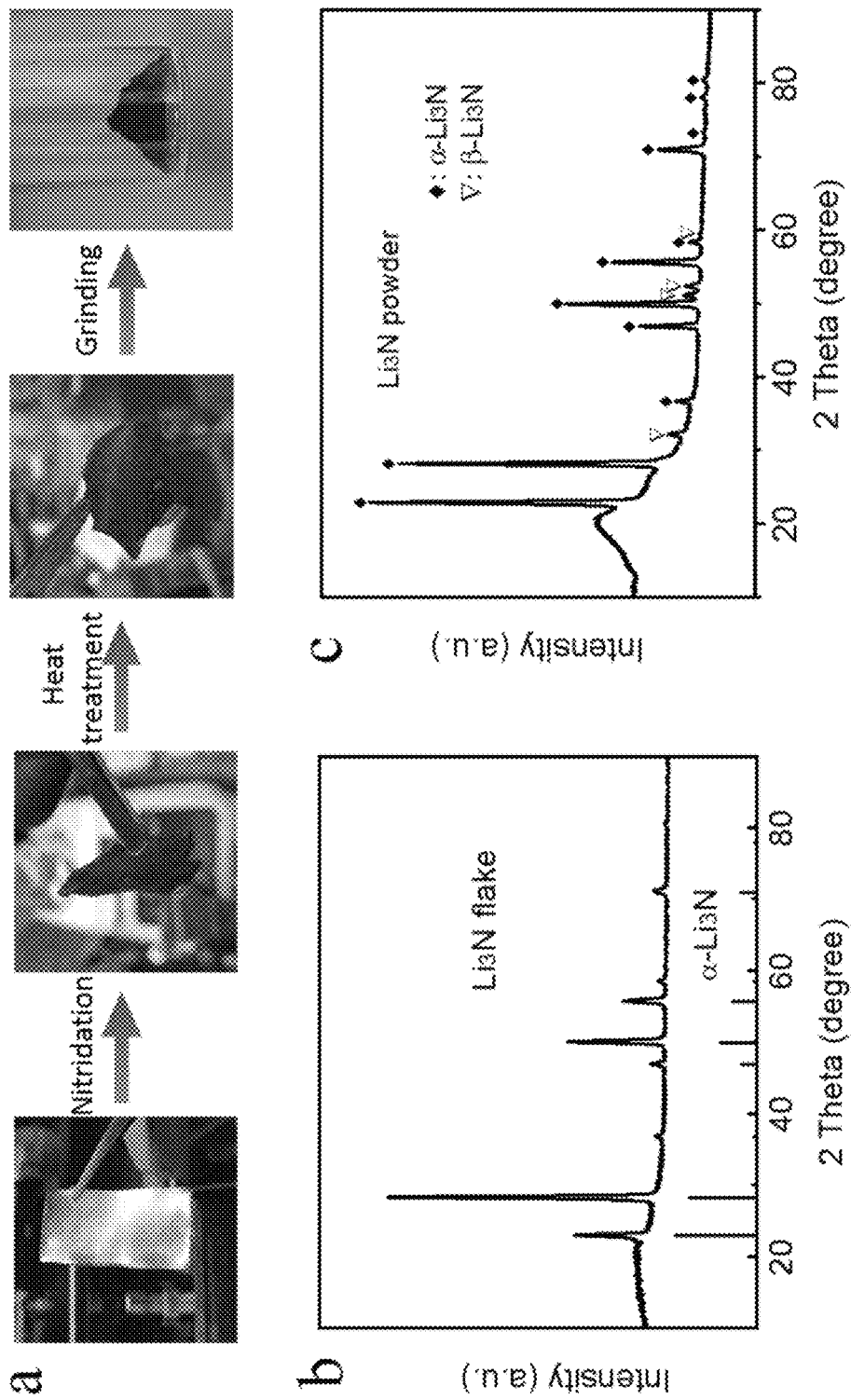
FIG. 31: Fabrication of $Li_3N$ and XRD characterizations. a, Synthesis of $Li_3N$ material via nitridation of lithium metal in $N_2$ atmosphere and annealing process (about 180° C., about 24 hours). b,c, XRD results of the as-prepared $Li_3N$ flake (b) and powder after grinding (c). The XRD result shows that the as-formed $Li_3N$ flake is substantially pure alfa-phase $Li_3N$. After grinding, the product contains a small amount of beta-phase $Li_3N$.

Stable $Li_3N$ for Efficient Battery Cathode Prelithiation $Li_3N$ was synthesized via nitridation of lithium metal in $N_2$ atmosphere and annealing at about 180° C. for about 24 hours (FIG. 31(a)). XRD results of an as-prepared $Li_3N$ flake and a powder after grinding were obtained (FIGS. 31(b) and (c)). The XRD results show that the as-formed $Li_3N$ flake is substantially pure alfa-phase $Li_3N$, and, after grinding, the powder contains a small portion of beta-phase $Li_3N$.

Figure 32:
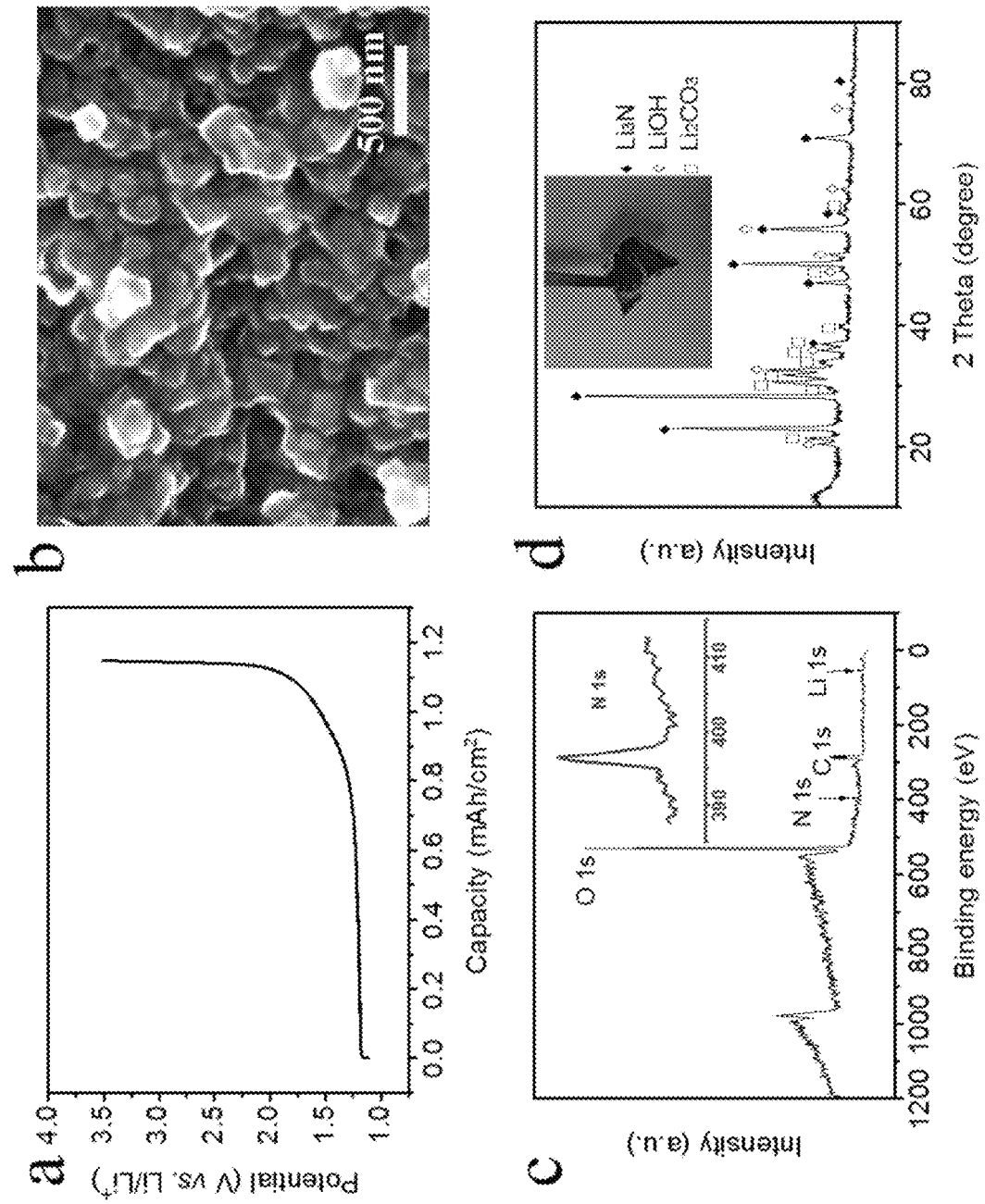
FIG. 32: Electrochemical properties of a $Li_3N$ film formed on a metal current collector and enviromnental stability of a $Li_3N$ flake. a, Charge potential profile of a $Li_3N$ electrode on a Cu substrate prepared through the nitridation of a Li metal film in nitrogen atmosphere. b, Cross-section SEM image of the $Li_3N$ film electrode, showing that the $Li_3N$ film electrode is composed of interconected $Li_3N$ nanoparticles. c, Survey and high-solution N 1s XPS spectra of a $Li_3N$ flake, indicating that the surface of $Li_3N$ is oxidized during the synthesis. d, XRD result of a $Li_3N$ flake after exposure in ambient conditions for 30 days. The main phase of the sample is sill $Li_3N$, although LiOH and $Li_2CO_3$ are detected. This result indicates that the as-formed $Li_3N$ has good enviromnental stabilty.
Figure 33:
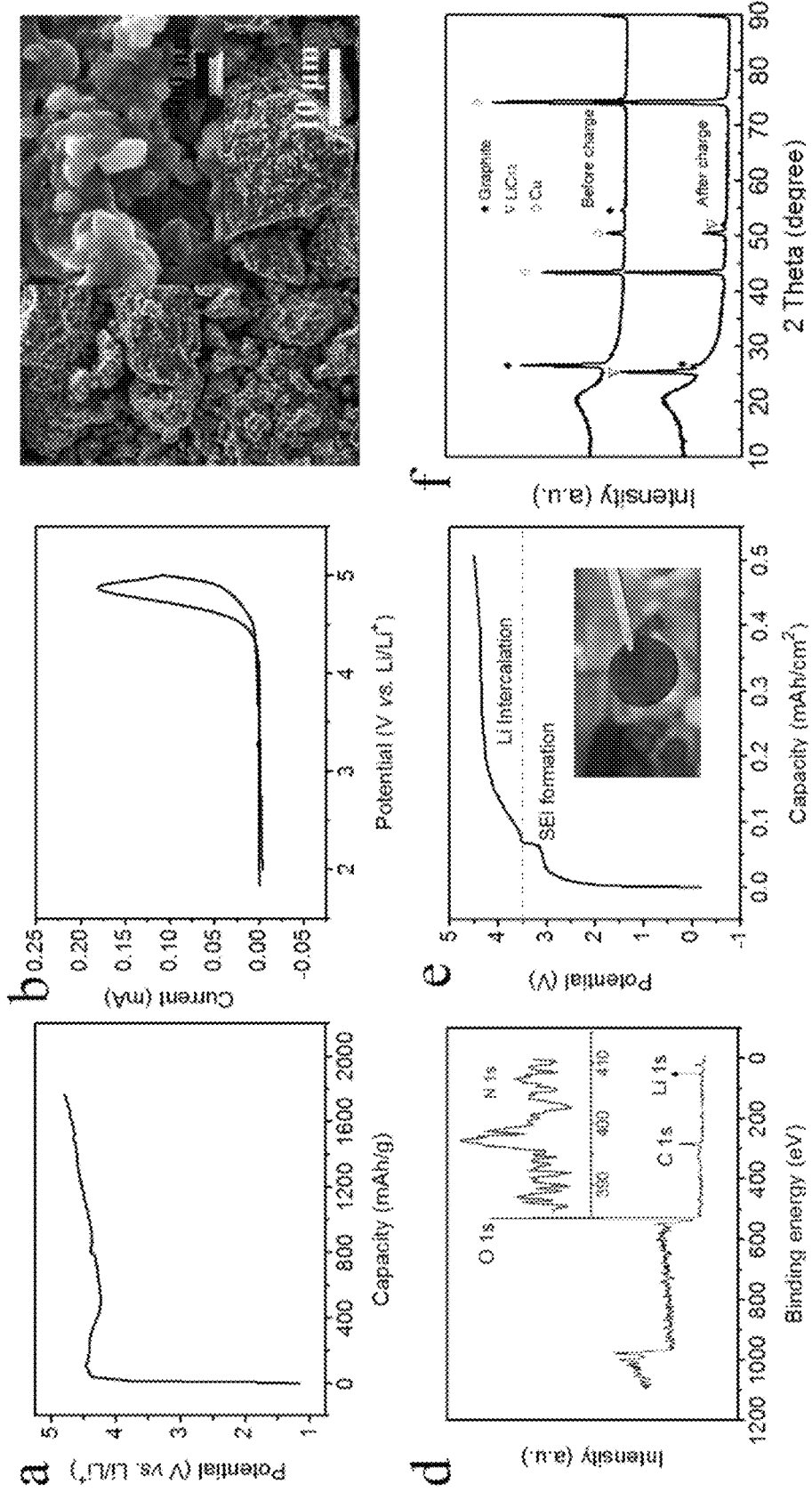
FIG. 33: Electrochemical properties of a $Li_3N$ electrode fabircated by a slurry manufacturing process. a,b, Charge potential profile (a) and cyclic voltammograms (b) of a $Li_3N$ electrode prepared by a slurry manufacturing process. c, SEM images of $Li_3N$ particles for slurry casting process, showing that the $Li_3N$ powder is composed of secondary $Li_3N$ particles. d, Survey and high-solution N is XPS spectra of the $Li_3N$ powder. e,f, Charge potential profile of a cell with $Li_3N$ electrode as the cathode and graphite as the anode (e), and XRD results of the graphite anode before and after battery charging (f). The results indicate that, during the battery charging process, lithium is extracted from the cathode composed of $Li_3N$, and the lithium loss at the anode surface caused by the formation of a solid electrolyte interphase (SEI) can be compensated.

The electrochemical performances and stability of $Li_3N$ flake and $Li_3N$ powder were investigated (FIG. 32 and FIG. 33). The results indicate that $Li_3N$ has good environmental stabilty, and that, during a battery charging process, lithium is extracted from a cathode composed of $Li_3N$, and the lithium loss at an anode surface can be compensated.

Figure 34:
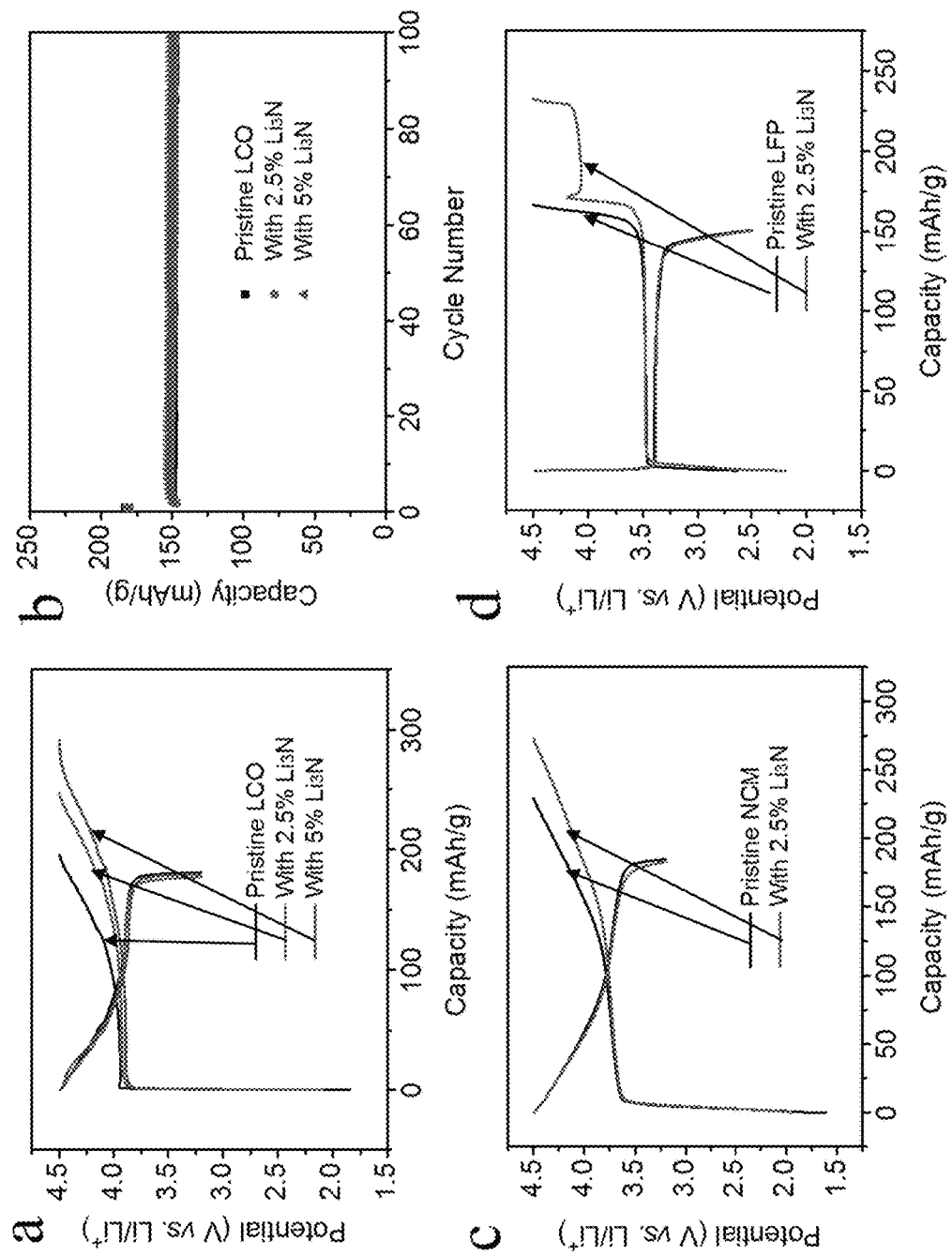
FIG. 34: Electrochemical characteristics of cathodes with $Li_3N$ additive. a,b, Initial charge and discharge curves (a) and cycling (b) of $LiCoO_2$ (LCO) cathodes with and without $Li_3N$ additive. c, The comparison of initial charge and discharge profiles of $LiNi_{0.6}Co_{0.2}Mn_{0.2}O_2$ (NCM) electrodes with and without $Li_3N$ additive. d, The comparison of initial charge and discharge profiles of $LiFePO_4$ (LFP) electrodes with and without $Li_3N$ additive. With $Li_3N$ additive, the initial charge capacites of cathodes increase, indicating the Li "donor" effect of $Li_3N$. Stable cycling performances are achieved for the LCO electrodes with various amounts of $Li_3N$ additive. This result shows that the $Li_3N$ additive has negligible negative effect on the stability of the cathode material.

To further investigate its electrochemical compatibility with cathode materials and lithium compensation effect, electrochemical performances of cathodes with $Li_3N$ as a prelithiation reagent were evaluated (FIG. 34). FIGS. 34(a) and (b) shows initial charge and discharge curves of $LiCoO_2$ (LCO) cathodes with and without the $Li_3N$ additive. Compared with the pristine LCO cathode, the LCO cathode with the $Li_3N$ addtive shows extended charge slope above about 3.8 V, arising from the decomposition of $Li_3N$ during charging. With the additive of about 2.5 wt. % $Li_3N$, the initial charge capacity of the cathode reaches about 246.4 mAh/g, about 50.9 mAh/g higher than the pristine LCO cathode. When the content of $Li_3N$ is about 5 wt. %, the cathode delivers a high initial charge capacity of about 291.1 mAh/g. Meanwhile, the LCO cathodes with and without $Li_3N$ show a similar discharge capacity and stable cycling. To show the generality of using $Li_3N$ as an additive for various cathodes, $LiNi_{0.6}Co_{0.2}Mn_{0.2}O_2$ (NCM) and $LiFePO_4$ (LFP) cathodes are also prepared. With the $Li_3N$ additive, the initial charge capacities increase significantly (FIGS. 34(c) and (d)). The initial charge capacity of NCM electrodes with about 2.5 wt. % of $Li_3N$ is about 272.6 mAh/g, while the pristine NCM electrode delivers an initial charge capacity of about 229.1 mAh/g. After adding about 2.5 wt. % of $Li_3N$ in LFP electrode, the first charge profile shows two noticeable pleateaus. The first plateau is located at about 3.48 V with a capacity of about 170 mAh/g, and the second plateau is located at about 4.1 V, delivering a capacity of about 62 mAh/g, corresponding to the extraction of Li from $Li_3N$.

Materials synthesis. Lithium metal foil (about 99.9%, Alfa Aesar, about 0.75 mm thick) was used as the starting material for the synthesis of $Li_3N$. During the synthesis, a piece of lithium metal foil (about 1 g) was placed in a nitrigen-filled glovebox with concentrations of moisture and oxygen below about 1.0 ppm. After 3 days, the lithium metal foil transformed into a $Li_3N$ flake, which was further heat treated at about 180° C. for about 24 hours. $Li_3N$ powder was obtained after grinding.

To fabricate the $Li_3N$ film on a conducting substrate, lithium metal foil was first melted at about 200° C. and sandwiched between two Cu foils under pressure. After the nitridation process in a nitrigen-filled glovebox, $Li_3N$ film was obtained. Before electrochemical measurements, one side of Cu foil was removed gently.

Characterization. XRD measurements were carried out on a panalytical X'pert diffractometer with Ni-filtered Cu K$\alpha$ radiation ($\lambda$=1.5406 Å). SEM images of samples were acquired on a FEI XL30 Sirion scanning electron microscope. A PHI Versa Probe 5000 system (Physical Electronics, MN) was employed for XPS characterization.

Electrochemical measurements. 2032-type coin cells were assembled in an Argon-filled glove box for electrochemical characterizations using a lithium foil as the counter/reference electrode, about 1 M $LiPF_6$ in a mixture of EC) and DEC (about 1:1 v/v) as the electrolyte, and a Celgard 2300 membrane as the separator. Battery performances were investigated by galvanostatic charge/discharge cycling on an Arbin Battery Cycler instrument. A VMP3 potentiostat (Bio-Logic) was employed for cyclic voltammetry (CV) measurements at a scanning rate of about 0.2 mV $s^{-1}$. Both the $Li_3N$ film on a Cu foil and normal $Li_3N$ electrode fabricated by a slurry method were subjected to electrochemical measurements. To prepare the normal $Li_3N$ electrode, $Li_3N$ powder (about 60 wt. %), carbon black (about 30 wt. %) and PVDF (about 10 wt. %) were dispersed uniformly in tetrahydrofuran (THF) to form a slurry. The slurry was cast onto an Al foil in the Argon-filled glovebox and dried.

All of the cathodes with the addition of $Li_3N$ were constructed using a slurry method by mixing the $Li_3N$ powder, cathode materials, carbon black and PVDF binder at different weight ratios in THF solvent. The contents of carbon black and PVDF are both about 5% in weight in LCO cathodes. The as-prepared LFP and NCM cathodes contain about 10 wt. % of carbon black and about 10 wt. % of PVDF. The typical mass loading of cathodes is about 5 mg/cm$^2$. Graphite electrodes are composed of about 80 wt. % of graphite powder (MTI Corporation), about 10 wt. % of carbon black and about 10 wt. % of PVDF. The lithium metal half cells of $Li_3N$ film electrode on Cu were charged to about 3.5 V at a current density of about 0.1 mA/cm$^2$. $Li_3N$/Li and $Li_3N$/graphite cells were charged to about 4.8 V and about 4.5 V at a current density of about 30 mA/g. The galvanostatic charge/discharge measurement of LCO and NCM/Li metal half cells was carried out with the cut-off potential range of about 3.2-4.5 V for the first cycle at about 0.1 C and about 3.2-4.3 V upon the following cycles at about 0.2 C. The cut-off potential range for $LiFePO_4$/Li half cells is about 2.5-4.5 V for the first cycle at about 0.1 C and about 2.5-4.3 V for the following cycles at about 0.2 C. The specific capacities here are based on the mass of the cathode active materials.

As used herein, the singular terms "a," "an," and "the" include plural referents unless the context clearly dictates otherwise. Thus, for example, reference to an object can include multiple objects unless the context clearly dictates otherwise.

As used herein, the term "set" refers to a collection of one or more objects. Thus, for example, a set of objects can include a single object or multiple objects. Objects of a set can be the same or different.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

As used herein, the terms "connect," "connected," "connecting," and "connection" refer to an operational coupling or linking. Connected objects can be directly coupled to one another or can be indirectly coupled to one another, such as through another set of objects.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

While the disclosure has been described with reference to the specific embodiments thereof, it should be understood by those skilled in the art that various changes may be made and equivalents may be substituted without departing from the true spirit and scope of the disclosure as defined by the appended claims. In addition, many modifications may be made to adapt a particular situation, material, composition of matter, method, operation or operations, to the objective, spirit and scope of the disclosure. All such modifications are intended to be within the scope of the claims appended hereto. In particular, while certain methods may have been described with reference to particular operations performed in a particular order, it will be understood that these operations may be combined, sub-divided, or re-ordered to form an equivalent method without departing from the teachings of the disclosure. Accordingly, unless specifically indicated herein, the order and grouping of the operations is not a limitation of the disclosure.

What is claimed is:

1. A method of forming a cathode, comprising:
providing a cathode additive by reacting nanoparticles of at least one metal compound selected from a metal oxide, a metal sulfide, a metal halide, a metal nitride, and a metal phosphide with molten lithium metal in elemental form to form a matrix comprising a lithium compound and metal nanostructures embedded in the matrix, wherein the lithium compound comprises at least one of a lithium oxide, a lithium chalcogenide, a lithium halide, a lithium nitride, or a lithium phosphide, and the metal nanostructures include at least one of Ti, Co, Ni, Fe, Mn, Mo, Pb, Zn, Cu, Sn, B, or Si;
combining the cathode additive with a cathode active material to form a mixture; and
applying the mixture to a current collector to form the cathode.

2. The method of claim 1, wherein a weight ratio of the cathode additive to the cathode active material in the mixture is in a range of 1/79 to 1/7.

3. The method of claim 1, wherein the lithium compound is at least one of $Li_2O$, $Li_2S$, $LiF$, $LiCl$, $LiBr$, $LiI$, $Li_3N$, $Li_3P$, $Li_2Se$, or $Li_2Te$.

4. The method of claim 1, wherein the lithium compound is nanostructured.

5. The method of claim 1, wherein the lithium compound is in a polycrystalline state.

6. The method of claim 1, wherein the metal nanostructures have dimensions in a range of 1 nm to 50 nm.

7. The method of claim 1, wherein at least some of the metal nanostructures are disposed fully within the matrix.

* * * * *